US011888270B2

(12) United States Patent
McRae

(10) Patent No.: US 11,888,270 B2
(45) Date of Patent: Jan. 30, 2024

(54) ELECTRICAL SAFETY SYSTEM FOR A CHRISTMAS TREE

(71) Applicant: NATIONAL CHRISTMAS PRODUCTS LLC, Cranford, NJ (US)

(72) Inventor: Michael M. McRae, Ormond Beach, FL (US)

(73) Assignee: NATIONAL CHRISTMAS PRODUCTS LLC, Cranford, NJ (US)

( * ) Notice: Subject to any disclaimer, the term of this patent is extended or adjusted under 35 U.S.C. 154(b) by 788 days.

(21) Appl. No.: 17/060,036

(22) Filed: Sep. 30, 2020

(65) Prior Publication Data

US 2021/0021088 A1 Jan. 21, 2021

Related U.S. Application Data

(63) Continuation of application No. 16/459,368, filed on Jul. 1, 2019, now Pat. No. 10,840,651, which is a (Continued)

(51) Int. Cl.

| | |
|---|---|
| ***H01R 13/73*** | (2006.01) |
| ***H01R 13/68*** | (2011.01) |
| ***H01R 24/22*** | (2011.01) |
| ***H01R 13/648*** | (2006.01) |
| ***H01R 4/64*** | (2006.01) |
| ***H01R 24/30*** | (2011.01) |
| ***H01R 13/713*** | (2006.01) |

(Continued)

(52) U.S. Cl.
CPC ............. *H01R 13/73* (2013.01); *H01R 4/643* (2013.01); *H01R 13/648* (2013.01); *H01R 13/6666* (2013.01); *H01R 13/68* (2013.01); *H01R 13/713* (2013.01); *H01R 24/22* (2013.01); *H01R 24/30* (2013.01); *A47G 33/06* (2013.01); *F21V 23/06* (2013.01); *H01R 4/302* (2013.01); *H01R 4/34* (2013.01); *H01R 11/12* (2013.01); *H01R 2103/00* (2013.01)

(58) Field of Classification Search
None
See application file for complete search history.

(56) References Cited

U.S. PATENT DOCUMENTS

| | | | |
|---|---|---|---|
| 2009/0209116 A1* | 8/2009 | Lopez .................. | H01R 13/516 439/76.2 |
| 2018/0219336 A1* | 8/2018 | Urashima .............. | H01R 13/60 |
| 2021/0021088 A1* | 1/2021 | McRae .................. | H01R 13/68 |

* cited by examiner

*Primary Examiner* — James Harvey
(74) *Attorney, Agent, or Firm* — Ellenoff Grossman & Schole LLP

(57) ABSTRACT

An artificial lighted tree is presented with power routed through the trunk and three-wire safety grounding. The tree comprising a fused electrical plug having improved safety features comprising: a body portion surrounding respective first ends of a first, a second and a third electrical wire, the body portion further comprising a fuse holder embedded within an upper region of the body portion, and a fuse adapted to be releasably secured within the fuse holder via releasable securing means, a live blade in communication with the first end of the first electrical wire, a neutral blade in communication with the first end of the second electrical wire, a ground pin receptacle in communication with the first end of the third electrical wire, wherein the body portion surrounds and maintains the live blade, neutral blade, and ground pin receptacle in spaced apart orientation corresponding to polarized sockets on an electrical wall outlet.

20 Claims, 23 Drawing Sheets

Related U.S. Application Data continuation of application No. 15/996,284, filed on Jun. 1, 2018, now Pat. No. 10,840,654, which is a continuation-in-part of application No. 15/707,802, filed on Sep. 18, 2017, now Pat. No. 9,991,648, which is a continuation-in-part of application No. 15/490,880, filed on Apr. 18, 2017, now Pat. No. 9,876,287.

(51) Int. Cl.

| | |
|---|---|
| ***H01R 13/66*** | (2006.01) |
| *H01R 11/12* | (2006.01) |
| *F21V 23/06* | (2006.01) |
| *H01R 103/00* | (2006.01) |
| *A47G 33/06* | (2006.01) |
| *H01R 4/34* | (2006.01) |
| *H01R 4/30* | (2006.01) |

ELECTRICAL SAFETY SYSTEM FOR A CHRISTMAS TREE

CROSS-REFERENCE TO RELATED APPLICATIONS

This application is a continuation of U.S. Non-Provisional Utility patent application Ser. No. 16/459,368, filed on Jul. 1, 2019 and entitled "Electrical Plug for a Safety Grounded Tree", which is a continuation of U.S. Non-Provisional Utility patent application Ser. No. 15/996,284, filed on Jun. 1, 2018 and entitled "An Electrical Plug for a Safety Grounded Tree", which is a continuation-in-part of U.S. Non-Provisional Utility patent application Ser. No. 15/707,802, filed on Sep. 18, 2017 and entitled "An Electrical Plug for a Safety Grounded Tree", which is a continuation-in-part of U.S. Non-Provisional Utility patent application Ser. No. 15/490,880, filed on Apr. 18, 2017 and entitled "An Electrical Plug and Socket Assembly for a Safety Grounded Tree", the entire disclosures of each and all of the above mentioned references are hereby incorporated herein by reference.

FIELD OF THE INVENTION

The present invention generally relates to artificial lighted trees and, in particular, to a system including a male power cord having a replaceable fuse for grounding a powered decorative artificial pre-lighted Christmas tree.

BACKGROUND OF THE INVENTION

Artificial pre-lighted Christmas trees, where the seasonal lights are incorporated on or with the tree, have become a popular alternative to both live trees and unlighted artificial trees. These trees are usually sectional for easy storage, with some lighted trees routing power for the lights up through the trunk of the tree with electrical connectors built into the ends of each tree section to distribute power to each section. A concern with such pre-lighted Christmas trees is the use of standard electrical power cords for powering the lights up through the trunk of the tree. The vast majority of electrical power cords generally have an 18 AWG wire cord with a maximum load of 5 amp and 600 watts at 120 volts. Most house wiring is 12 AWG with a 20 amp circuit breaker. At 120 volts, the breaker won't open until 2400 watts are reached. Since this greatly exceeds the appliance cord capability, the cord will overheat and incinerate unless protected by a fuse. The benefits of putting a fuse in an electrical plug have been known for some time. If a fuse is located in the plug of a standard three-wire plug that powers the tree directly, it can provide the protection of a fuse to any seasonal lights that may be incorporated on or with the tree. One potential problem encountered in designing a plug structure for making the fuses readily accessible is that the fuses may become too easily accessible when the conducting prongs of the plug are inserted in a wall socket. Under such conditions, it is very possible for a user to contact one of the electrical conductors normally abutting the fuse and receive a potentially serious shock.

Therefore, there is a need in the art for a lighted artificial Christmas tree with a fused electrical power cord plug that overcomes the limitations of the prior art by not allowing access to the fuse when the conducting prongs of the plug are inserted in a wall socket.

SUMMARY OF THE INVENTION

According to one embodiment of the present invention, an apparatus and method are provided for substantially preventing the inadvertent electrical connection of a standard plug to a female polarized socket of an electrical power cord through which electrical power is supplied, for instance, to an artificial lighted tree. The apparatus and method comprise a non-standard female polarized socket used in place of a standard female polarized socket on a three-prong safety grounded electrical power cord that may, for instance, be used to power an artificial lighted tree. The non-standard female polarized socket is configured to include raised side polarized socket walls with vertical half rounds in the respective sidewalls to uniquely mate with a non-standard two-prong non-polarized male electrical plug, customized to include mating grooves cut into the top and bottom lips. Advantageously, use of a non-standard female polarized socket paired with a non-standard two-prong non-polarized male electrical plug functions to prevent electrical connection by standard two-prong non-polarized male electrical plugs thereby permitting use of a three wire cord having a lower amperage rating than a standard UL approved three wire cord.

Another embodiment of the apparatus and method in accordance with the present invention provides a non-standard female polarized socket used in place of a standard female polarized socket on a three-prong safety grounded electrical power cord that may, for instance, be used with an artificial lighted tree. The non-standard female polarized socket is configured to include a single raised side polarized socket wall including a vertical half round in the single raised sidewall to uniquely mate with a non-standard two-prong non-polarized male electrical plug including mating grooves cut into the top and bottom lips. In a further embodiment, the apparatus utilizes a cover to prevent the inadvertent disconnection between the non-standard two-prong non-polarized male electrical plug and non-standard female polarized socket.

According to one embodiment, a non-standard female polarized socket used in place of a standard female polarized socket on a three-prong safety grounded electrical power cord and comprises: (a) a polarized socket body; (b) electrical contact means disposed on the inner polarized socket body for receiving and engaging contact prongs of a non-standard two-prong non-polarized male electrical plug and for providing electrical connections with ends of the conductor wires of an electrical cord; (c) convex vertical half rounds formed in respective raised side walls of the non-standard female polarized socket adapted to mate with a non-standard two-prong non-polarized male electrical plug including mating grooves cut into the top and bottom lips.

According to one embodiment, a non-standard female polarized socket used in place of a standard female polarized socket on a three-prong safety grounded electrical power cord and comprises: (a) a polarized socket body; (b) electrical contact means disposed on the inner polarized socket body for receiving and engaging contact prongs of a non-standard two-prong non-polarized male electrical plug and for providing electrical connections with ends of the conductor wires of an electrical cord; (c) a single convex vertical half round formed in a single raised side wall of the polarized socket; (d) a cover for covering the engagement of the non-standard female polarized with the non-standard two-prong non-polarized male electrical plug including mating grooves cut into the top and bottom lips.

According to yet another embodiment of the present invention, an artificial lighted tree is provided with an electrical power cord with improved safety features, the power cord comprising a plug at a first distal end having an internal fuse which can easily and quickly be replaced without disassembly of the plug.

According to another embodiment of the present invention, an electrical power cord having improved safety features comprises a fused electrical plug at a first distal end, the plug comprising: a body portion surrounding respective first ends of a first, a second and a third electrical wire, the body portion further comprising a fuse holder embedded within an upper region of the body portion, and a fuse adapted to be releasably secured within the fuse holder via releasable securing means, a live blade in electrical communication with the first end of the first electrical wire, a neutral blade in electrical communication with the first end of the second electrical wire, a ground pin receptacle in electrical communication with the first end of the third electrical wire, wherein the body portion surrounds and maintains the live blade, neutral blade, and ground pin receptacle in spaced apart orientation corresponding to wall sockets on an electrical outlet, and a cable coupled to the fused electrical plug, the cable comprising: said first, second and third electrical wires, wherein the first electrical wire is configured to carry current to a load device, the second electrical wire is configured to return current from the load device, and the third electrical wire is configured to carry current to a ground connection. Wherein the fuse is releasably secured within the fuse holder via an access door which maintains it in a closed position when the prongs of the plug have been inserted into a polarized socket rending the internal fuse virtually inaccessible. A compressible latch mechanism attached to the access door maintains the access door in the closed position when the prongs of the plug of the power cord plug are inserted into a wall socket thereby locking the access door in its closed position. The access door may be opened by removing the power cord plug from the wall socket.

According to some embodiments of the present invention, a dual fused two-prong non-polarized male electrical plug is attached to and provides power and a safety ground connection for a powered decorative lighted Christmas tree. The decorative lighted Christmas tree includes power routed through the trunk of the tree and three-wire safety grounding.

According to embodiments of the present invention, a three-prong safety ground electrical power cord further comprises a foot switch configured to toggle on and off an electrical signal provided to the non-standard female end of the electrical power cord.

According to some embodiments of the present invention, the hot wires of the non-standard three-prong polarized male electrical plug enter the trunk of the decorative lighted hollow body Christmas tree through a securing grommet; wherein the ground conductor extends from the electrical power cord and terminates in a ground electrical connector configured to attach to the electrically conductive wall of the hollow body.

According to some embodiments of the present invention, the hot wires of the non-standard three-prong non-polarized male electrical plug enter the trunk of the decorative lighted hollow body Christmas tree through a securing grommet; wherein the ground conductor extends from the electrical power cord and terminates in a ground electrical connector configured to attach to the electrically conductive wall of the hollow body.

According to some embodiments of the present invention, an electrical safety system for use with a decorative lighted Christmas tree, the system comprising a pole mounted molded a pole mounted molded electrical junction box comprising a housing having first and second flanges for securing the pole mounted molded electrical junction box to a rounded conductive metal trunk structure; a circuit breaker located within the housing of the electrical junction box and having stationary and movable contacts operable between open and closed positions; a manually operable reset button located on a front panel of the molded electrical junction box, the reset button being electrically connected between said circuit breaker and ground for selectively actuating said circuit breaker for opening said movable contacts; a three-prong safety grounded plug coupled to said housing of said electrical junction box for supplying power to said electrical junction box from an external voltage source over a multi-conductor cable comprising a neutral member, a hot member and a ground member; wherein said hot member of the multi-conductor cable is electrically coupled to the circuit breaker within said housing at a first connection point; wherein said neutral member of the multi-conductor cable passes through the circuit breaker without making an electrical connection; wherein said ground member of the multi-conductor cable is mounted directly to said rounded conductive metal trunk structure; and wherein said neutral and hot members exit the circuit breaker and pass through the inside of said rounded conductive metal trunk structure to terminate at respective connection points outside said rounded conductive metal trunk structure.

According to some embodiments of the present invention, an electrical safety system is provided for use with a decorative lighted Christmas tree, the system comprising a pole mounted molded electrical junction box comprising a housing having a grounding strap for securing the housing to a rounded conductive metal trunk structure; a circuit breaker located within the housing and having stationary and movable contacts operable between open and closed positions; a manually operable reset button on a front panel of the molded electrical junction box electrically connected between said circuit breaker and ground for selectively actuating said circuit breaker for opening said movable contacts; a three-prong safety grounded plug for supplying power to the pole mounted molded electrical junction box from an external voltage source over a multi-conductor cable comprising a neutral member, a hot member and a ground member; wherein said hot member of the multi-conductor cable is electrically coupled to the circuit breaker within the housing at a first connection point; wherein said neutral member of the multi-conductor cable passes through the circuit breaker without making an electrical connection; wherein said ground member is mounted directly to the rounded conductive metal trunk structure; wherein said neutral and hot members exit the circuit breaker and pass through the inside of the rounded conductive metal trunk of the decorative lighted Christmas tree to terminate at a respective second and third connection outside the trunk; and wherein said ground member terminates at a termination point on said grounding strap and said grounding strap is grounded to the rounded conductive metal trunk of the structure tree via a star washer and tamper-proof securing screw.

According to some embodiments of the present invention, an electrical safety system is provided for use with a decorative lighted Christmas tree, the system comprising a pole mounted molded electrical junction box comprising a housing having a grounding strap for securing the housing to a rounded conductive metal trunk structure; a circuit breaker within the housing and having stationary and movable contacts operable between open and closed positions; a manually operable reset button on a front panel of the molded electrical box electrically connected between said circuit breaker and ground for selectively actuating said circuit breaker for opening said movable contacts; a female polarized socket located within the housing on a front face; a three-prong safety grounded plug for supplying power to the molded electrical junction box from an external source over a multi-conductor cable comprising a neutral member, a hot member and a ground member; wherein said hot member of the multi-conductor cable is electrically coupled to the circuit breaker within the housing at a first connection point; wherein said neutral member of the multi-conductor cable passes through the circuit breaker without making an electrical connection.

According to some embodiments of the present invention, an electrical safety system is provided comprising a pole mounted molded electrical junction box comprising a housing having a grounding strap for securing the housing to a rounded conductive metal trunk structure; a female electrical polarized socket located within the housing on a front face; a three-prong safety grounded plug for supplying power to the molded electrical junction box from an external source over a multi-conductor cable comprising a neutral member, a hot member and a ground member; wherein said neutral and hot members exit the circuit breaker and pass through the inside of the rounded conductive metal trunk of the decorative lighted Christmas tree to terminate at a second connection outside the trunk; wherein said neutral member of the multi-conductor cable passes through the circuit breaker without making an electrical connection; wherein said ground member terminates at a termination point on said grounding strap and wherein said grounding strap is grounded to the rounded conductive metal trunk of the structure tree via a star washer and tamper-proof securing screw; a foot switch coupled in line with the three-prong safety grounded plug, a circuit breaker located within a foot switch housing, the circuit breaker having stationary and movable contacts operable between open and closed positions, the foot switch configured to toggle on and off an electrical signal provided from said external source via the three-prong safety grounded plug; and a manually operable reset button located on a front face of the foot switch housing, the reset button being electrically connected between said circuit breaker and ground for selectively actuating said circuit breaker for opening said movable contacts; and wherein said hot member of the multi-conductor cable is electrically coupled to the circuit breaker within the foot switch at a first connection point; wherein said neutral and hot members of the multi-conductor cable are routed from said first connection point to terminate in said female electrical polarized socket.

According to some embodiments of the present invention, a pole mounted molded electrical junction box is provided comprising a pole mounted molded electrical junction box comprising a housing having a grounding strap for securing the housing to a rounded conductive metal trunk structure; a circuit breaker within the housing and having stationary and movable contacts operable between open and closed positions; a manually operable reset button located on a front panel of the molded electrical box and electrically connected between said circuit breaker and ground for selectively actuating said circuit breaker for opening said movable contacts; a female polarized socket located within the housing on a front face; a three-prong safety grounded plug for supplying power to the molded electrical junction box from an external source over a multi-conductor cable comprising a neutral member, a hot member, a neutral member and a ground member; a foot switch coupled in line with the three-prong safety grounded plug, the foot switch configured to toggle on and off an electrical signal provided from said external source via the three-prong safety grounded plug; wherein said ground member terminates at a termination point on said grounding strap; wherein said hot member of the multi-conductor cable is electrically coupled to the foot switch at a first connection point; and wherein said members exit the foot switch housing and terminate at a second connection point at said circuit breaker.

According to some embodiments of the present invention, an electrical power cord having improved safety features is provided, the electrical power cord comprising: a three-prong safety grounded plug located at a first distal end of the electrical power cord, the plug electrically coupled to a multi-conductor cable comprising a neutral member, a hot member and a ground member; a circuit breaker located in-line with the multi-conductor cable, the circuit breaker having stationary and movable contacts operable between open and closed positions; a manually operable reset button located on a front panel of the circuit breaker electrically connected between said circuit breaker and the hot member for selectively actuating said circuit breaker for opening said movable contacts; a conventional female polarized socket located at a second distal end of the electrical power cord, wherein the hot member of the multi-conductor cable is electrically coupled to the circuit breaker at a first connection point; and wherein the neutral and hot members of the multi-conductor cable are electrically coupled to the conventional female polarized socket at a second connection point.

According to some embodiments of the present invention, an electrical power cord having improved safety features is provided, the electrical power cord comprising: a three-prong safety grounded plug located at a first distal end of the electrical power cord, the plug electrically coupled to a multi-conductor cable comprising a neutral member, a hot member and a ground member; a circuit breaker located in-line with the multi-conductor cable, the circuit breaker having stationary and movable contacts operable between open and closed positions; a manually operable reset button located on a front panel of the circuit breaker electrically connected between said circuit breaker and the hot member for selectively actuating said circuit breaker for opening said movable contacts; a conventional female polarized socket located at a second distal end of the electrical power cord, wherein the hot member of the multi-conductor cable is electrically coupled to the circuit breaker at a first connection point; wherein said ground member terminates in a ring terminal and mounts to the rounded conductive metal trunk structure via a star washer and tamper-proof securing screw; and wherein the neutral and hot members of the multi-conductor cable are electrically coupled to the conventional female polarized socket at a second connection point; wherein said ground member terminates in a ring terminal and mounts to the rounded conductive metal trunk structure via a star washer and tamper-proof securing screw. Wherein the circuit breaker can include an internal fuse. Wherein the electrical power cord precludes both internal and external faults.

According to some embodiments of the present invention, an external voltage source supplying power to said electrical power cord is a high voltage source selected from the group consisting of: a 115 VAC source, 220 VAC source. Wherein the voltage source can be a Class 2, low voltage source.

According to some embodiments of the present invention, a multi-function electrical safety system for use with a decorative lighted Christmas tree comprises, a pole mounted molded electrical junction box comprising a housing having a grounding strap for securing the housing to a rounded conductive metal trunk structure; an electrical power cord comprising: a three-prong safety grounded plug located at a first distal end of the power cord, the plug being electrically coupled to a multi-conductor cable comprising a neutral member, a hot member and a ground member; a circuit breaker positioned in-line with the multi-conductor cable, the circuit breaker having stationary and movable contacts operable between open and closed positions; a manually operable reset button located on a front panel of the circuit breaker electrically connected between said circuit breaker and the ground member for selectively actuating said circuit breaker for opening said movable contacts; a fused and polarized female socket located at a second distal end of the electrical power cord, a high to low AC to DC adapter electrically connected to a two-wire cord that passes through the inside of the rounded conductive metal trunk structure, the high to low AC to DC adapter adapted to be plugged into the fused and polarized female socket; wherein the hot member of the multi-conductor cable is electrically coupled to the circuit breaker at a first connection point; and wherein the neutral member and hot member of the multi-conductor cable are electrically coupled to the fused and polarized female socket at a second connection point.

According to some embodiments of the present invention, a multi-function electrical safety system for use with a decorative lighted Christmas tree comprises an electrical power cord comprising: a three-prong safety grounded plug located at a first distal end of the electrical power cord, the plug electrically coupled to a multi-conductor cable comprising a neutral member, a hot member and a ground member; a fused non-polarized female socket at a second distal end of the electrical power cord; a circuit breaker located inside of a foot petal switch housing, the housing being positioned in-line with the multi-conductor cable between the first and second distal ends, the circuit breaker having stationary and movable contacts operable between open and closed positions; a manually operable reset button electrically connected between the circuit breaker and the ground member of the electrical power cord for selectively actuating said circuit breaker for opening said movable contacts; a high to low AC to DC adapter electrically connected to a two-wire cord that passes through the inside of the rounded conductive metal trunk structure, the adapter being adapted to be plugged into the fused polarized female socket; a remote control receiver, wirelessly coupled to a remote control transmitter, the remote control receiver electrically coupling the high to low AC to DC adapter to polarized DC connectors outside of the rounded conductive metal trunk structure; a safety ground means comprising a safety ground wire terminating in a ring terminal attached to a bare metal ground point on the rounded conductive metal trunk structure by a tamper-proof screw and a star washer; wherein the hot member of the multi-conductor cable is electrically coupled to the circuit breaker at a first connection point; and wherein the neutral and hot members of the multi-conductor cable are electrically coupled to the fused non-polarized female socket at a second connection point.

According to some embodiments of the present invention, an electrical safety system for use with a decorative lighted Christmas tree, comprises an electrical power cord comprising: a three-prong safety grounded plug located at a first distal end of the electrical power cord, the plug electrically coupled to a multi-conductor cable comprising a neutral member, a hot member and a ground member; a circuit breaker located inside of a foot petal switch housing, in-line with the multi-conductor cable, the circuit breaker having stationary and movable contacts operable between open and closed positions; a manually operable reset button located on a front panel of the circuit breaker electrically connected between the circuit breaker and the ground member for selectively actuating said circuit breaker for opening said movable contacts; a high to low AC to DC adapter electrically connected to a two-wire cord that passes through the inside of the rounded conductive metal trunk structure, the adapter being adapted to be plugged into the fused polarized female socket; a remote control receiver, wirelessly coupled to a remote control transmitter, the remote control receiver electrically coupling the high to low AC to DC adapter to polarized DC connectors outside of the rounded conductive metal trunk structure; safety ground means comprising a safety ground wire terminating in a ring terminal attached to a bare metal ground point on the rounded conductive metal trunk structure by a tamper-proof screw and a star washer; wherein the foot petal switch housing includes a reset button and a fuse; wherein the hot member of the multi-conductor cable is electrically coupled to the circuit breaker at a first connection point; and wherein the neutral and hot members of the multi-conductor cable are electrically coupled to the fused non-polarized female socket at a second connection point.

According to some embodiments of the present invention, an electrical safety system for use with a decorative lighted Christmas tree comprises a pole mounted molded electrical junction box comprising a housing having a grounding strap for securing the housing to a rounded conductive metal trunk structure; an electrical power cord comprising: a three-prong safety grounded plug located at a first distal end of the power cord, the plug being electrically coupled to a multi-conductor cable comprising a neutral member, a hot member and a ground member; a circuit breaker positioned in-line with the multi-conductor cable, the circuit breaker having stationary and movable contacts operable between open and closed positions; a manually operable reset button located on a front panel of the circuit breaker electrically connected between said circuit breaker and the ground member for selectively actuating said circuit breaker for opening said movable contacts; a polarized conventional female socket located at a second distal end of the electrical power cord, a high to low AC to DC adapter electrically connected to a two-wire cord that passes through the inside of the rounded conductive metal trunk structure, the adapter being adapted to be plugged into the fused polarized female socket; wherein the hot member of the multi-conductor cable is electrically coupled to the circuit breaker at a first connection point; and wherein the neutral member and hot member of the multi-conductor cable are electrically coupled to the polarized conventional female socket at a second connection point.

The foregoing summary of the present invention with the preferred embodiments should not be construed to limit the scope of the invention. It should be understood and obvious to one skilled in the art that the embodiments of the invention thus described may be further non-standard without departing from the spirit and scope of the invention.

DETAILED SPECIFICATION

Figure 1:
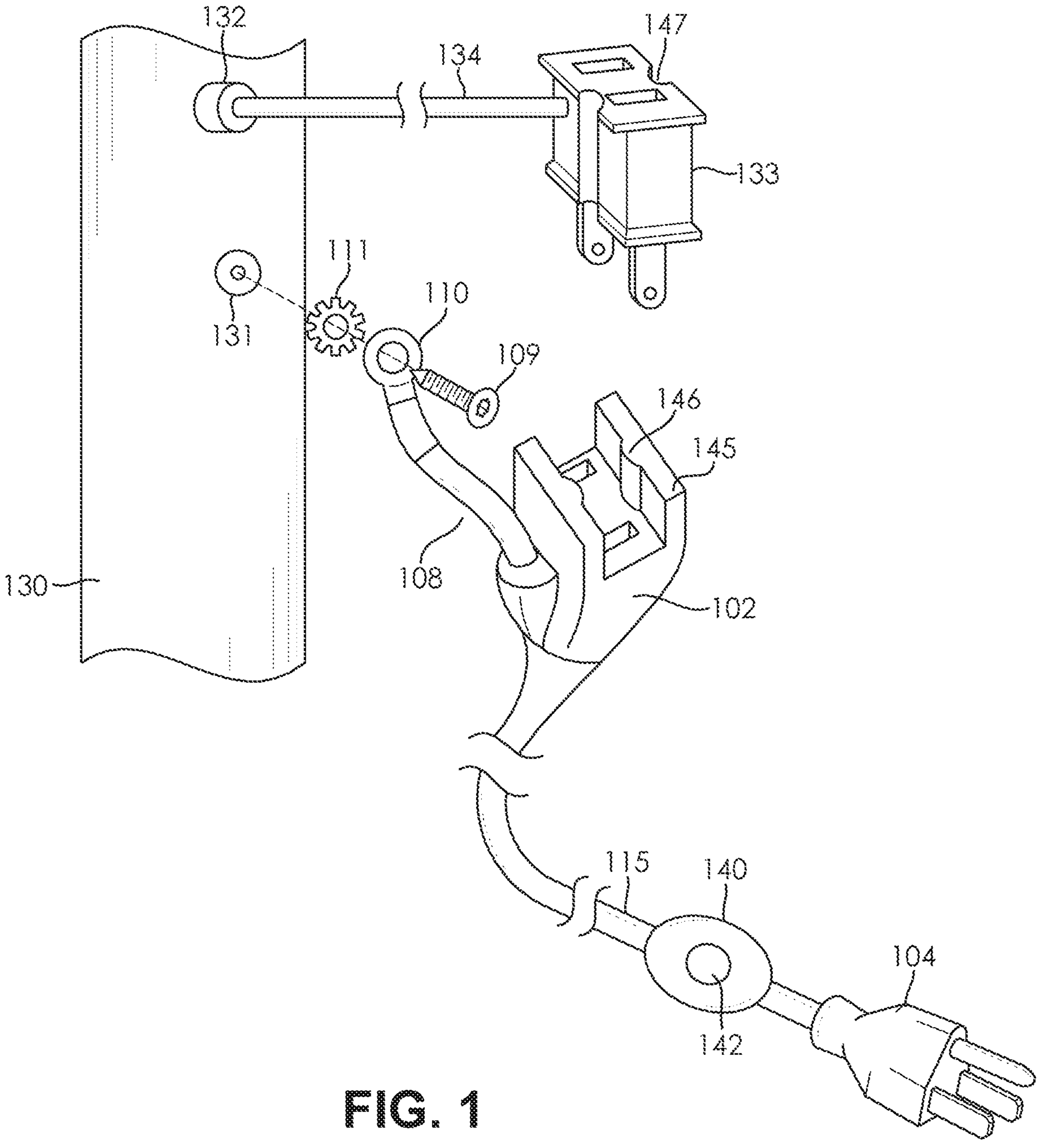
FIG. 1 shows a system for powering a decorative tree including a tree-mounted power cord with a non-standard female end which attaches to the powered decorative tree, according to some embodiments of the present invention.

According to some embodiments of the present invention, FIG. 1 shows a perspective view of a power cord 115 with a conventional 3-prong safety grounded plug 104 on the male end and a non-standard female socket 102 on the female end. The non-standard female polarized socket 102 is shown to include convex vertical half rounds 146 formed in respective raised side walls 145 of the non-standard female polarized socket 102 adapted to mate with a non-standard two-prong non-polarized electrical plug 133 including mating grooves 147 cut into the top and bottom lips. The non-standard female polarized socket 102 of power cord 115 is positioned on a first surface of the female end and also positioned to a second surface of the female end that is non-coplanar to the first surface. The term non-coplanar here can refer to any portion of the female end which is not on the plane defined by the face of the female polarized socket on the first surface. Instead of having a rounded polarized socket to receive a ground prong on the first surface, a ground wire 108 extends out from the second surface of the non-standard female polarized socket and is terminated with a ring terminal 110. This ring terminal 110 is attached to a bare metal ground point 131 on the decorative lighted Christmas tree trunk 130 with a tamper-proof screw 109 and a star washer 111. The power wires 134 of the non-standard two-prong non-polarized male electrical plug 133 enter the trunk of the decorative lighted Christmas tree trunk 130 through a securing grommet 132. Power is distributed within the Christmas tree to various, connectors, and/or light strings on the decorative lighted Christmas tree. An important feature of the power cord 115 depicted in FIG. 1 is that the ground connection (e.g., ground wire 108) can be made independently of the hot and neutral connection of the non-standard two-prong non-polarized male electrical plug 133 without interfering with the ability of the non-standard two-prong non-polarized male electrical plug 133 to be plugged in and removed from the female end 120 of the power cord. One way of achieving this is by placing the ground connection 108 on a surface other than the first surface where the non-standard female polarized socket 102 is placed.

Figure 2A:
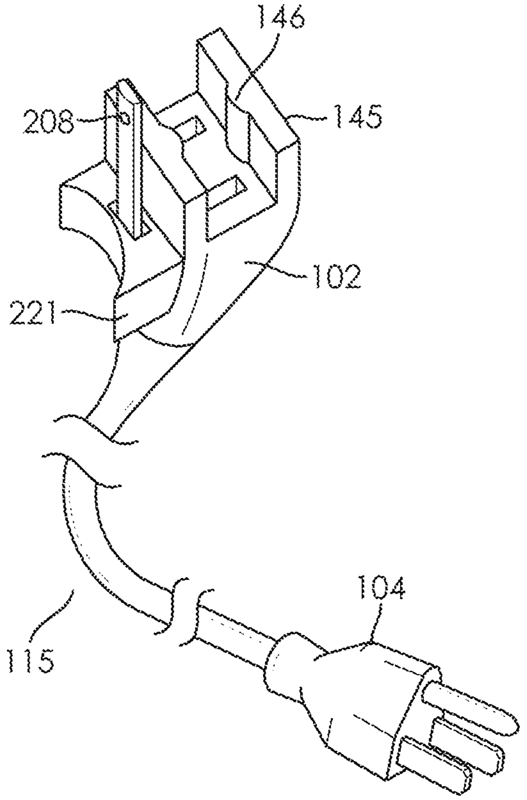
FIG. 2*a* shows a perspective view of a tree-mounted power cord of FIG. 1 with a non-conventional modified female end including half round verticals in raised sidewalls and a ground prong which attaches to a powered decorative tree through a grounding point, according to some embodiments of the present invention.

According to an alternate embodiment of the present invention, FIG. 2*a* shows a different version of the power cord 115 of FIG. 1. In accordance with the present embodiment, the ground wire 108 connection to the trunk 130 shown in the embodiment of FIG. 1 is replaced with a ground prong 208. The ground prong 208 is bent at two 90 degree angles so that it lines up flush with the Christmas tree trunk 130 and the molded base of the non-standard female polarized socket 102. A curved portion 221 of the molded base of the non-standard female polarized socket 102 of the female end is curved to fit the rounded trunk 130 of the decorative lighted Christmas tree.

Figure 2B:
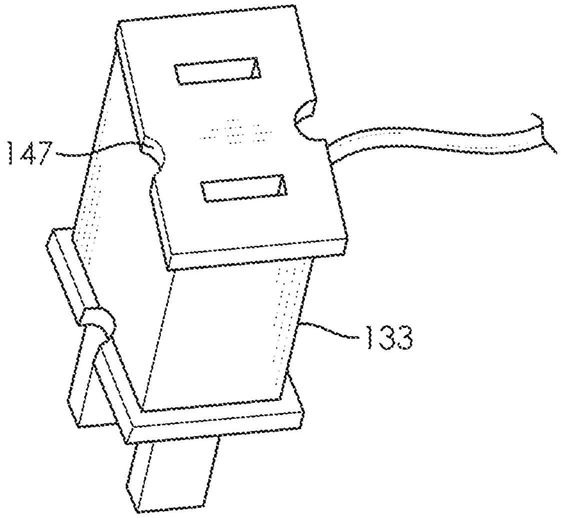
FIG. 2*b* shows a perspective view of a tree mounted non-standard two-prong non-polarized male electrical plug including grooves cut into the top and bottom lip portions of two faces of the plug which attaches to the powered decorative tree of FIG. 1, according to some embodiments of the present invention.

FIG. 2*b* shows a perspective view of the non-standard two-prong non-polarized male electrical plug 133 of FIG. 1. As shown, the non-polarized male electrical plug 133 includes mating grooves 147 cut into the respective top and bottom lips of the non-standard two-prong non-polarized male electrical plug 133 to mate with the non-standard female polarized socket 102 of the power cord 115 as shown in FIGS. 1 and 2*a*.

In a preferred embodiment, in the non-standard two-prong non-polarized male electrical plug 133, both the hot and neutral wires pass through fuses (not shown) because there is no guarantee that the mating plug 133 will be connected in a particular orientation. Alternatively, a single fuse may be placed in the 3-prong safety grounded plug 104, as shown in FIGS. 1 and 2*a*, so that the single fuse is electrically connected in line with the hot wire. In this case, only a single fuse is needed in lieu of the doubly fused male mating plug 133. For safety, the 3-prong safety grounded plug 104 can be configured with a sliding door (not shown) providing access to the fuse. The sliding door only slides open when the grounded male mating plug 133 is not plugged into a female polarized socket 102.

According to an alternate embodiment of the present invention, as illustrated in FIGS. 3-6, a different version of a tree-mounted power cord 115 includes a safety cover 344, shown in exploded view, and a conventional female polarized socket 320 in lieu of the modified non-standard female polarized socket 102 as shown in FIGS. 1 and 2*a*. In the present embodiment, the conventional female polarized socket 320 attaches to both the trunk 130 of the powered decorative tree and to a non-standard two-prong fused non-polarized male electrical plug 333 which is of a different configuration than the one shown in FIGS. 1 and 2*b*.

Figure 4:
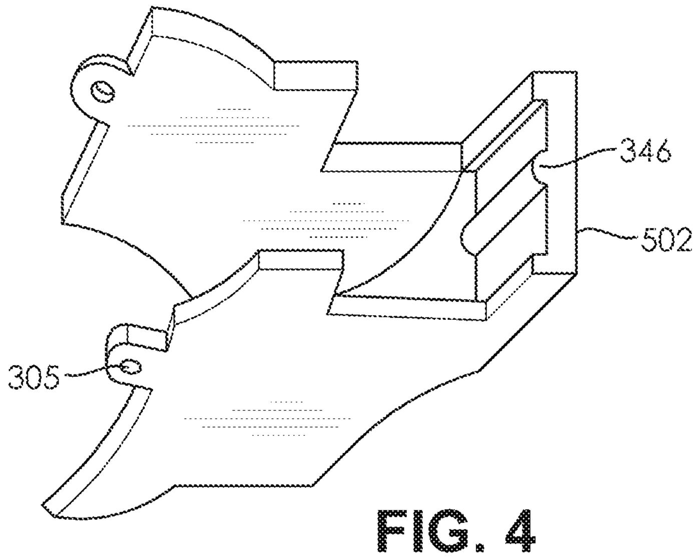
FIG. 4 shows a perspective view of the safety cover of FIG. 3, according to some embodiments of the present invention.

As best illustrated in FIG. 4, according to the presently described embodiment, the non-standard two-prong fused non-polarized male electrical plug 333 is shown to include a single mating groove 446 cut into the top and bottom lips. The power wires 534 of the non-standard two-prong fused non-polarized male electrical plug 533 separately attaches to the powered electrical tree 103 through a securing grommet 432, as shown in FIG. 5.

Figure 3:
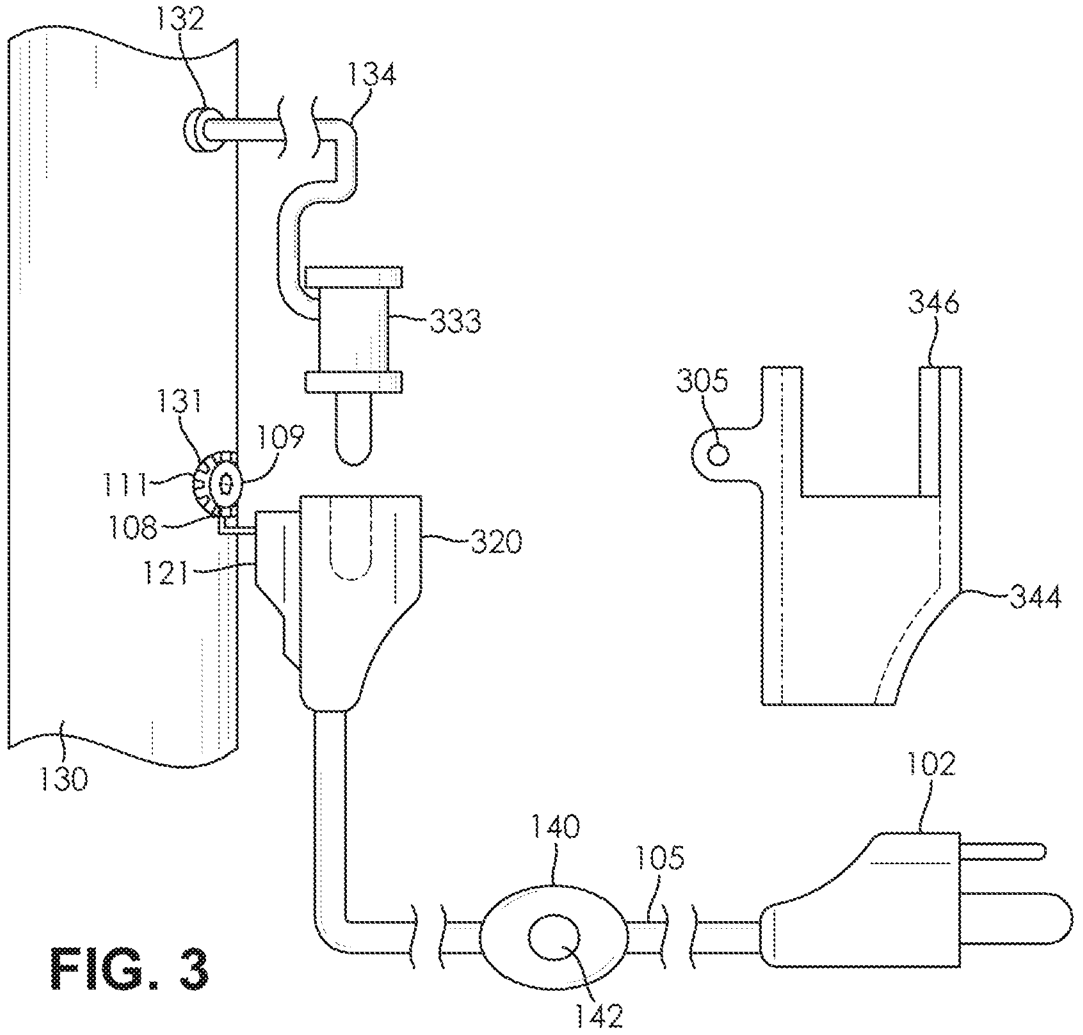
FIG. 3 shows a partially exploded view of a system for powering a decorative tree including a tree-mounted power cord with a non-standard female end which attaches to a powered decorative tree including a safety cover and an optional foot switch, according to some embodiments of the present invention.
Figure 6:
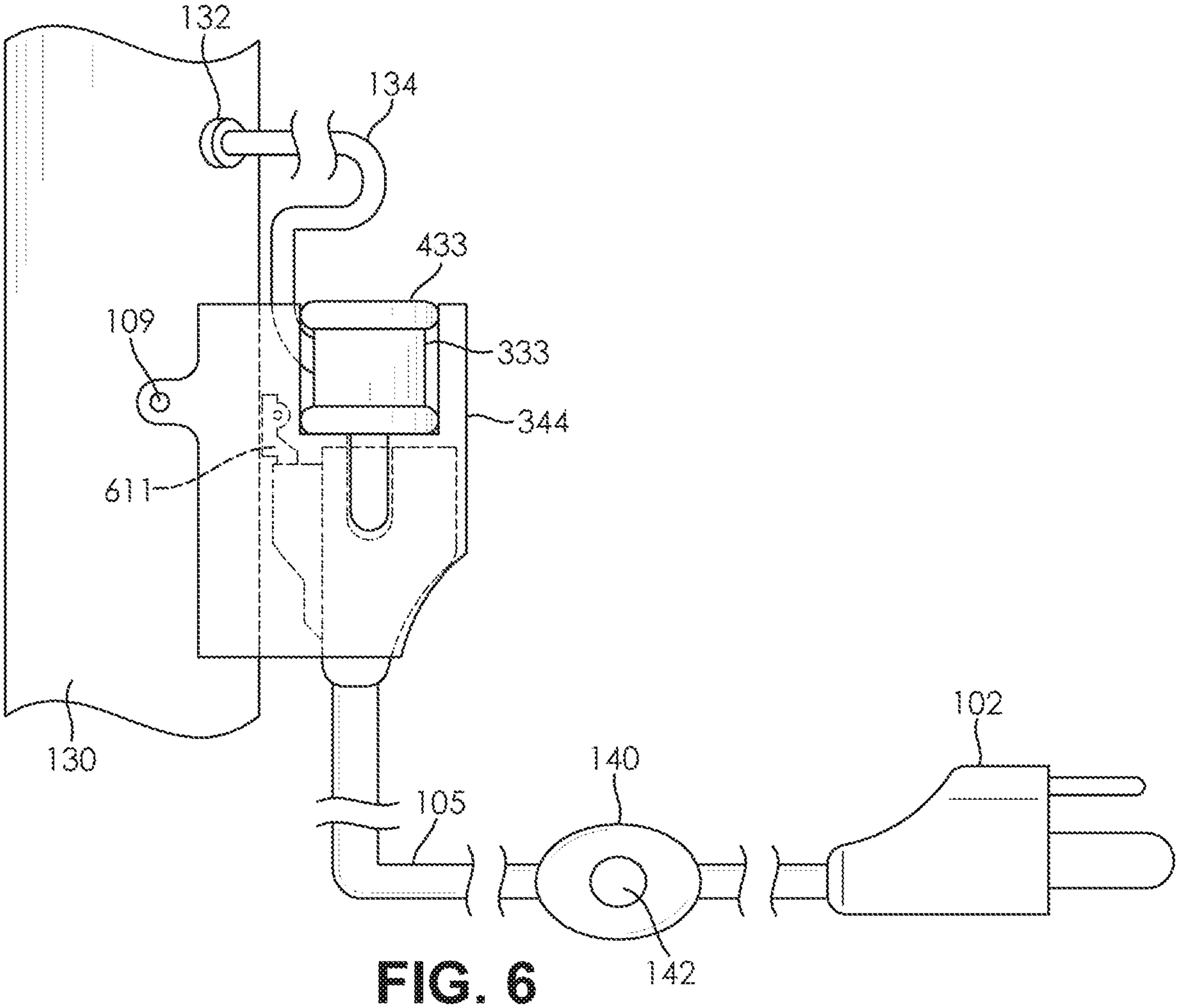
FIG. 6 shows a non-exploded view of the safety system of FIG. 3 for powering a decorative tree, according to some embodiments of the present invention.

As best shown in FIGS. 3 and 6, there is shown a safety cover 344 that attaches to the powered decorative tree via mounting holes 305 secured to attachment means, such as tamper proof screws 109. FIG. 6 shows the safety cover 344 fixedly attached to the trunk 130 of the powered electrical tree 103 via tamper proof screws 109. There is also shown grounding tab 611 secured to the tree trunk 130 via a tamper proof securing screw (not shown). The safety cover 344 is intended to cover both the non-standard two-prong fused non-polarized male electrical plug 533 and the standard conventional female polarized socket 320 to prevent the inadvertent use of a standard conventional plug from being plugged into the power cord.

Figure 5:
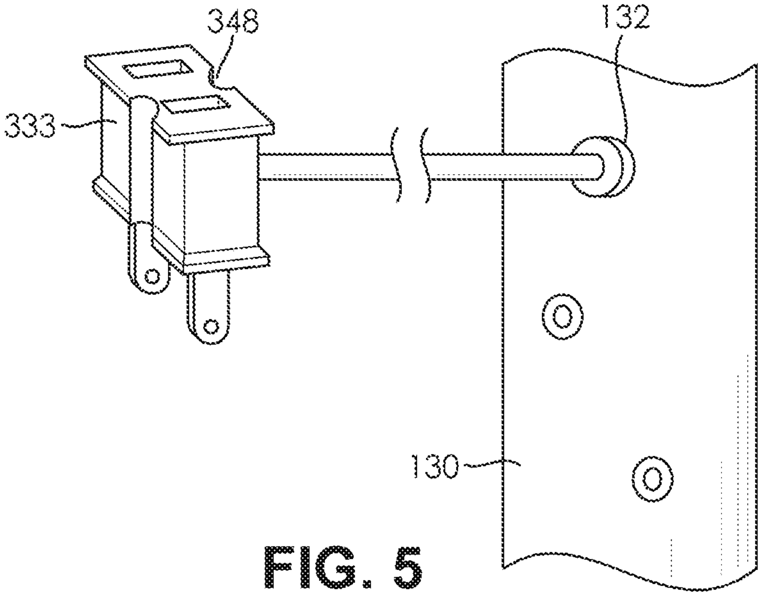
FIG. 5 shows a detailed view of the non-standard two-prong non-polarized male electrical plug of FIG. 3, according to some embodiments of the present invention.

As shown in FIG. 4, the safety cover 344 includes a single convex vertical half round 346 in an interior face of the safety cover 344 intended to mate with corresponding concave vertical half rounds 348 in the upper and lower lip of the non-polarized non-standard two-prong non-polarized male electrical plug 333, as shown in FIG. 5.

FIGS. 1, 3, 6 and 10 show an optional foot switch 140, 340, 640, 1040 in line with the power cord 115. The optional foot switch 140, 340, 640, 1040 contains a push-button toggle switch 142, 342, 642, 1042 which controls power to the decorative lighted Christmas tree. The optional foot switch 140, 340, 640, 1040 allows for controlling the lighting of the tree. In other embodiments, the control of the lighting of the tree may be controlled by one or more control elements, such as a switch, a selector knob, an indicator panel, or any other human interface device (HID) or any combination thereof. One of ordinary skill in the art would appreciate that there are numerous types of control elements that could be utilized with embodiments of the present invention, and embodiments of the present invention are contemplated for use with any type of control element. According to one embodiment of the present invention, the foot switch may include electronics which convert the high voltage AC to low voltage DC and pass the ground connection through to the non-standard DC pin and blade polarized female socket (not shown) to allow for proper grounding even when high voltage AC is not used to run the lights on the decorative lighted Christmas tree.

Figure 7:
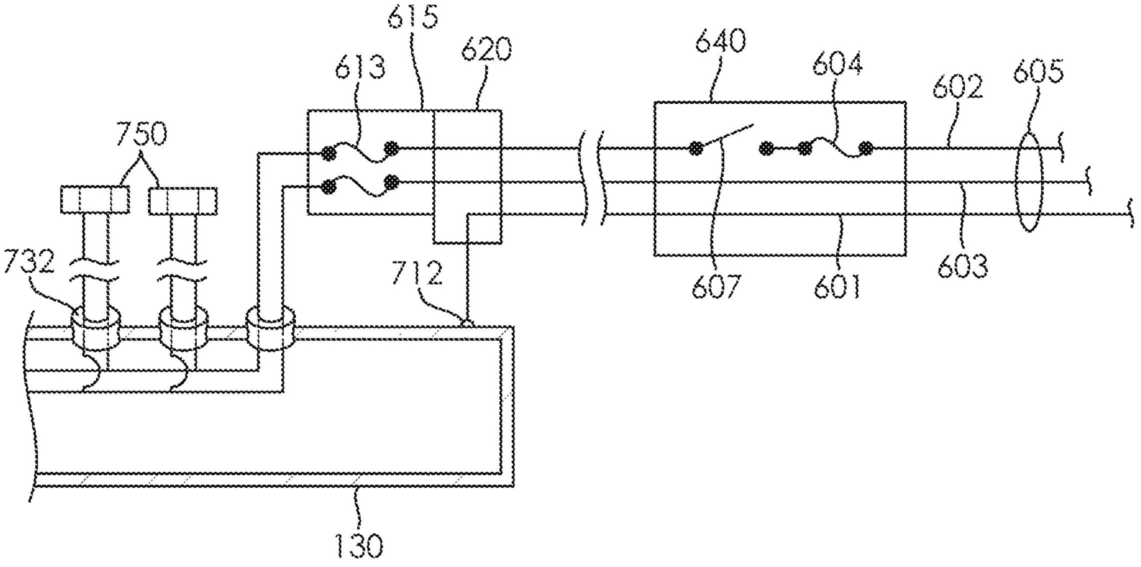
FIG. 7 shows a schematic diagram of a safety system for grounding a powered decorative tree according to some embodiments illustrated in FIGS. 1-6 of the present invention.

According to another embodiment of the present invention, FIG. 7 shows a schematic diagram the safety grounded decorative lighted Christmas tree. The 3-prong safety grounded plug 115 sends electrical conductors through a single pole switch 607. In one embodiment this switch is the foot switch 120 shown in FIGS. 1, 3 and 6. An electrical conductor 712 is then grounded to the conductive trunk 130, creating a ground connection from the conductive trunk 130 to the ground wire 601 through an attachment means, such as a screw. The hot wire 602, and neutral wire 603 pass through the electrical connector 620 to a corresponding connector 615 that houses two fuses 613. Alternatively, the fuses 613 can be housed in the electrical connector 620, or elsewhere on the tree. The hot wire 602 and neutral wire 603 then pass into the trunk 430 through a securing grommet 732 to route power throughout the inside of the trunk. Side connectors 750 outside the trunk are connected to the hot 706 and neutral 707 wires that pass through securing grommets 732 from inside the tree trunk 130 to outside the tree trunk 130. The side electrical connectors 750 may be as simple as a wire, electrically connected to the wires inside the tree trunk 130, and merely passing through a hole (not shown) in the trunk 730 to the lights on the tree, or it may be a complex detachable multi-conductor connector as depicted in this application's parent application, U.S. patent application Ser. No. 14/317,291, entitled "Safety Grounded Tree" filed Jun. 27, 2014. One of ordinary skill in the art would appreciate that there are numerous types of side electrical connector that could be utilized with embodiments of the present invention, and embodiments of the present invention are contemplated for use with any appropriate type of side electrical connector.

Figure 8:
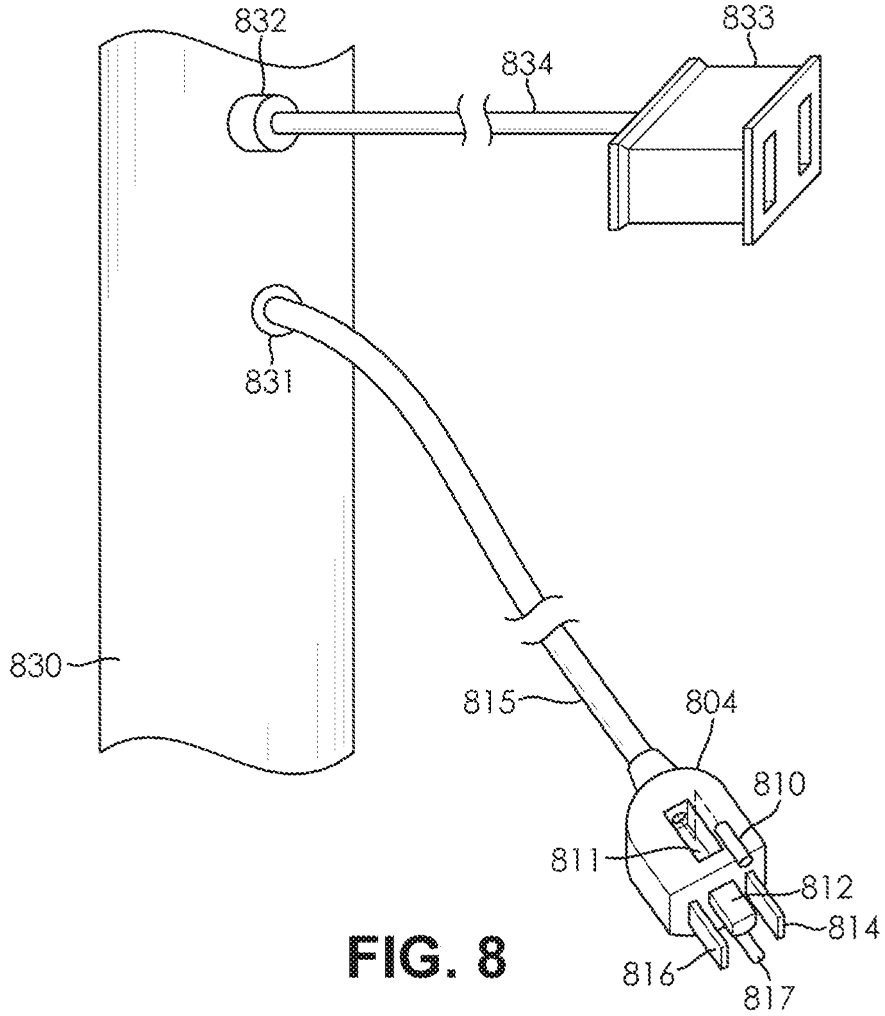
FIG. 8 shows a system for powering a decorative tree including a tree-mounted power cord with a non-standard fused three-prong polarized male electrical plug which attaches to and grounds the powered decorative tree, according to some embodiments of the present invention.

According to some embodiments of the present invention, FIG. 8 shows a perspective view of a power cord 815 with a fused 3-prong safety grounded plug 804 on the male end. The fused 3-prong safety grounded plug 804 is shown to include a live (hot) blade 816 in electrical communication with the first end of a first electrical wire (not shown) that enters the conductive trunk 930 through the securing grommet 931, a neutral blade 814 in electrical communication with the first end of a second electrical wire (not shown) through the securing grommet 831, and a ground pin 817 in electrical communication with the first end of a third electrical wire (not shown) through the securing grommet 931.

According to some embodiments of the present invention, the primary difference in the fused 3-prong safety grounded plug 804 of FIG. 8 is the access panel 811 which reveals fuse 810 when in an open position. The access panel 811 is of a generally rectangular shape and includes and access door (not shown) that is controlled by compressible engagement/disengagement means 812 (e.g., a plunger) on the plug 804 for releasably securing the fuse 810 from the recess 811 when the electrical plug 804 is disconnected from an outlet.

Figure 9:
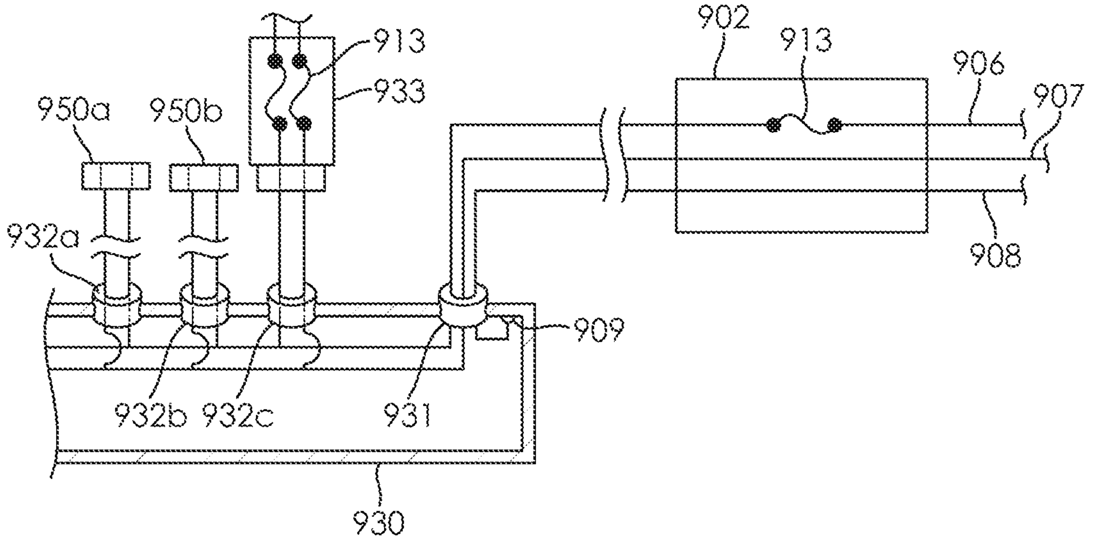
FIG. 9 shows a schematic diagram of a safety system for grounding a powered decorative tree according to the embodiment illustrated in FIG. 9 of the present invention.

According to another embodiment of the present invention, FIG. 9 shows a schematic diagram the safety grounded decorative lighted Christmas tree. The 3-prong safety grounded plug 804 of FIG. 8 sends electrical conductors (hot wire 906, neutral wire 907, and ground wire 908) through a 3-wire male plug 902 that is singly fused 913 to hot wire 906. The three electrical conductors 906, 907, 908 then enter the conductive trunk 930 through securing grommet **932*d* to route power throughout the inside of the conductive trunk 930. After passing through securing grommet 931, the ground wire 908 is grounded to the electrically conductive wall of the conductive trunk 930 at a ground connection point 909, creating a ground connection from the conductive trunk 930 to the ground wire 908. In one embodiment, ground connection point 909 is a screw. The hot wire 906, and neutral wire 907 then pass into the conductive trunk 930 through securing grommets 932*a*, 932*b* and 932*c* to route power from inside the conductive trunk 930 to female polarized sockets 950*a*, 950*b*, located outside of the conductive trunk 930 and male plug 933, which is double fused and which is also located outside of the conductive trunk 930 as shown. The male plug 933 is preferably a standard NEMA 1 two-prong non-polarized plug. The female polarized sockets 950*a*, 950*b* may be polarized or non-polarized. Both polarized and non-polarized sockets are configured to accept a standard NEMA 1 two-prong non-polarized plug. The hot wire and neutral wire leaving the double fused male connector 833** connect to one or multiple strings of light for lighting the tree.

Figure 10:
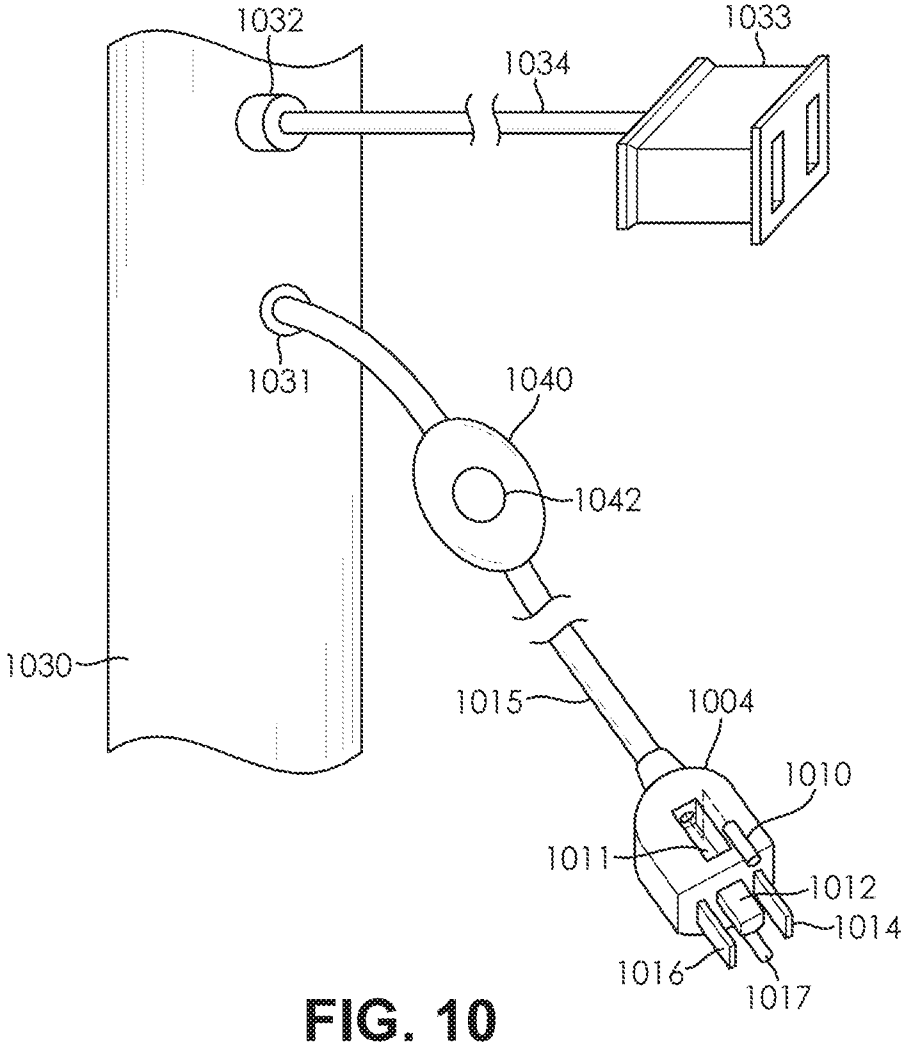
FIG. 10 shows a system for powering a decorative tree, according to some embodiments of the present invention.

According to another embodiment of the present invention, FIG. 10 shows another embodiment of this invention. According to this embodiment, an electrical safety system for use with a decorative lighted Christmas tree, the system comprising a non-standard fused polarized male plug with ground pin 1017, and neutral blade 1014 are connected internally to wires that pass through the foot switch 1040 and into the metal tree pole 1030 via the grommet 1031 and the neutral wire then is internally connected to the neutral wires that exit the for connectors outside the tree pole 1030 and are 1 of 2 wires in the cable 1034 that terminate to polarized connector 1033 while the hot blade 1016 connects internally inside the polarized fused plug to one end of the fuse holder 1011 that holds fuse 1010 that then connects to the other end of the fuse holder 1011 that connects to the internally hot wire of cable 1015 and goes into the foot petal 1040 connecting to the switch 1042 leaving the other side of the switch to go into the pole 1030 though grommet 1031 connecting inside the pole 1030 to the other hot wires exiting cables such as 1034 into the hot side of the polarized connector 1033.

Figure 11:
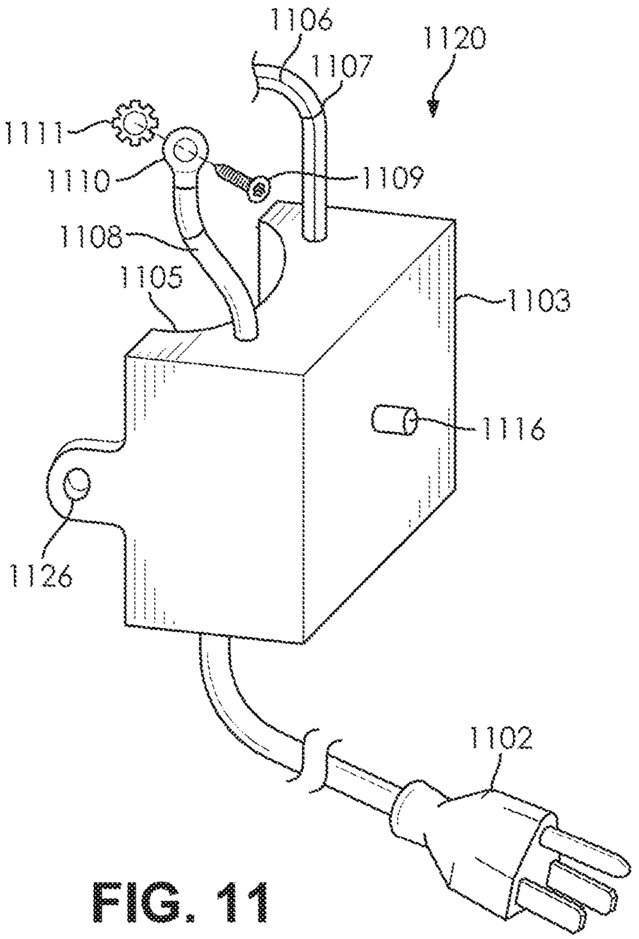
FIG. 11 shows a perspective view of a tree pole mounted electrical housing including an internal circuit breaker and reset button, providing an interface between an electrical cord and a ground connection according to some embodiments of the present invention.
Figure 12:
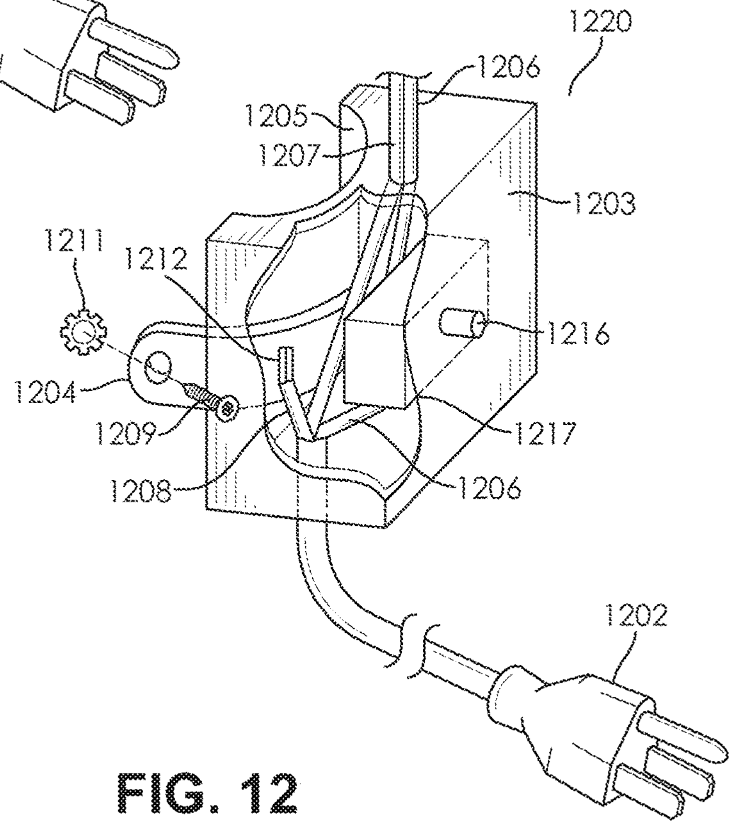
FIG. 12 shows a partial cutaway view of the housing of the molded electrical box, including an internal circuit breaker and reset button, according to one embodiment.

According to some embodiments of the present invention, FIG. 11 shows an electrical safety system for use with a decorative lighted Christmas tree, the system comprising a molded electrical box 1120 including a housing 1103 with a flange 1126 on each side (one of which is shown) for securing the molded electrical box 1120 to a rounded conductive metal trunk (pole) of a decorative lighted Christmas tree (not shown). A three-prong safety grounded plug 1102 supplies power to the decorative lighted Christmas tree and comprises hot wire 1106, neutral wire 1107, and ground wire 1108, each of which are connected in the molded electrical box 1120. A circuit breaker, similar to what is shown in the embodiment corresponding to FIG. 12, is located inside the molded electrical box 1120 and includes a manually operated reset button 1116 on the front panel. Hot wire 1106 and neutral wire 1107 project from a top surface of the housing 1103, wire 1106 enters the molded electrical box 1103 and connects to circuit breaker 1217 as seen in FIG. 12 and then exits the circuit breaker, along with wire neutral wire 1107 that then exits molded box 1103 both wires hoot 1106 and 1107 then enter the tree pole 1031 as seen in FIG. 10. A safety ground feature is provided by a safety ground wire 1108, shown exiting a top surface of the housing 103 and terminating in ring terminal 1110, star washer 1111 and tamper proof securing screw 1109, each of which are mounted to the rounded conductive metal trunk (pole) of the decorative lighted Christmas tree with tamper proof securing screw 1109. A rounded back 1105 of the molded housing 1103 is molded to fit the curvature of the decorative lighted Christmas tree. This allows the flanges 1126 and the molded back 1105 of the electrical box 1120 to sit flush against the decorative lighted Christmas tree and provide a secure connection that is less likely to shift or break from being bumped or nudged during assembly disassembly or general use of the decorative lighted Christmas tree. In place of the flanges 1126, the electrical box 1101 can also be attached to the decorative lighted Christmas tree by way of an adhesive, glue, welding, or any other attachment means. One of ordinary skill in the art would understand that any kind of attachment means may be used to attach the electrical box to the decorative lighted Christmas tree without departing from the spirit and scope of the present invention.

According to another embodiment of the present invention, FIG. 12 shows a partial cutaway view of the housing 1203 of the molded electrical box 1220. Similar to the embodiment shown in FIG. 11, a circuit breaker 1217 is located inside the molded electrical box 1220 and includes reset button 1216 on the front panel. Hot wire 1206 is electrically coupled to the circuit breaker 1217 which then extends into the rounded conductive metal trunk (pole) of a decorative lighted Christmas tree along with neutral wire 1207. One notable difference between this embodiment and the previously described embodiment of FIG. 11 is that instead of the ground wire being connected to the conductive trunk of the decorative lighted Christmas tree by a ring terminal, as shown in FIG. 11, in the present embodiment, the safety ground wire 1208 is bound to a grounding strap 1204 that is attached to the conductive trunk of the decorative lighted Christmas tree by a tamper-proof screw 1209 and star washer 1211. The grounding strap 1204 comprises two flanges 1204 (one of which are shown) that are formed from a single piece of metal that extend through the back of the electrical box 1220. The two flanges 1204 extend outside the electrical box 1220, exposing a mounting hole which connects to the conductive trunk of the decorative lighted Christmas tree through a star washer 1211.

Figure 13:
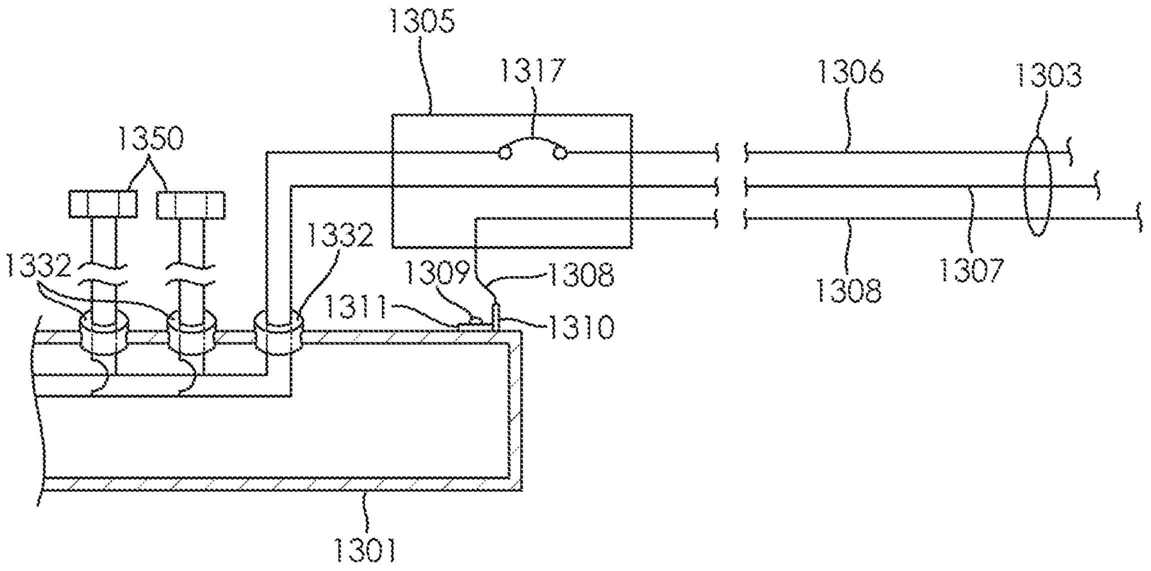
FIG. 13 shows a schematic diagram of a safety system for grounding a powered decorative tree according to the embodiments illustrated in FIG. 11 of the present invention.

FIG. 13 shows a schematic diagram the safety grounded decorative lighted Christmas tree according to the embodiment illustrated in FIG. 11. The hot wire 1306 and neutral wire 1307 pass through electrical molded box 1305. There, the hot wire 1306 connects and then exits the circuit breaker 1317 and passes into the trunk 1301 of the decorative lighted Christmas tree through securing grommet 1332 to route power throughout the inside of the trunk. The ground wire 1308 is connected to the conductive trunk 1301 of the decorative lighted Christmas tree by a ring terminal 1310 electrically connected to the end of the ground wire 1308. A tamper-proof screw 1309 attaches to the conductive trunk of the decorative lighted Christmas tree through the ring terminal 1310 and a star washer 1311. Side connectors 1350 outside the trunk 1301 are connected to the hot 1306 and neutral 1307 wires that pass through securing grommets 1332 from inside the tree trunk to outside the tree trunk. Side electrical connectors 1350 may be as simple as a wire, electrically connected to the wires inside the tree trunk 1301, and merely passing through a hole (not shown) in the trunk 1301 to the lights on the tree, or it may be a complex detachable multi-conductor connector as depicted in this application's parent application, U.S. patent application Ser. No. 14/317,291, entitled "Safety Grounded Tree" filed Jun. 27, 2014. One of ordinary skill in the art would appreciate that there are numerous types of side electrical connector that could be utilized with embodiments of the present invention, and embodiments of the present invention are contemplated for use with any appropriate type of side electrical connector.

Figure 14:
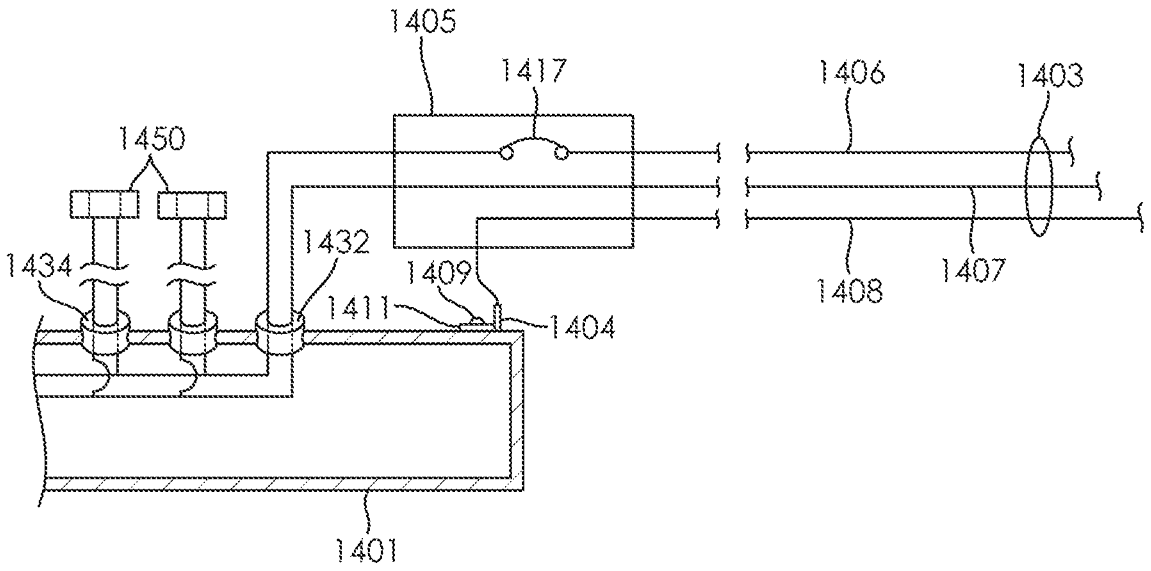
FIG. 14 shows a schematic diagram of a safety system for grounding a powered decorative tree according to some embodiments illustrated in FIG. 12 of the present invention.

FIG. 14 illustrates a schematic diagram of the safety grounded decorative lighted Christmas tree according to the embodiment illustrated in FIG. 12. A notable difference between this circuit and the circuit of FIG. 13 is that instead of the ground wire being connected to the conductive trunk of the decorative lighted Christmas tree by a ring terminal, as shown in FIG. 13, a grounding strap 1404 is attached to the conductive trunk 1401 of the decorative lighted Christmas tree by a tamper-proof screw 1409 and star washer 1411.

Figure 15:
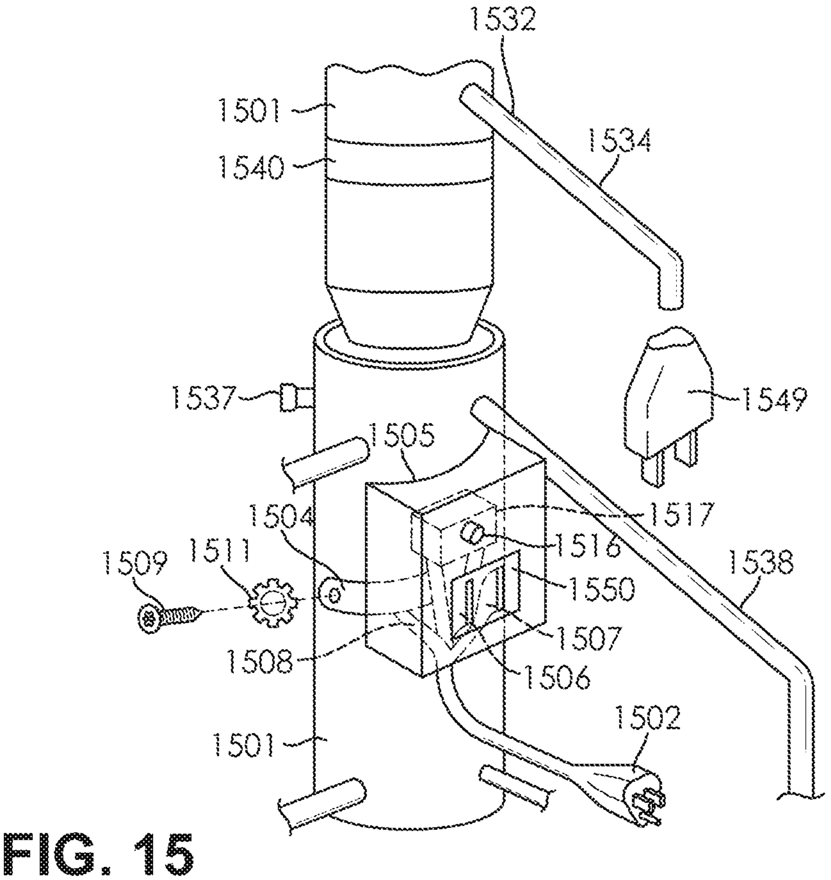
FIG. 15 is a perspective view of a pole mounted molded electrical box secured to a rounded conductive metal trunk of a decorative lighted Christmas tree, according to one embodiment.

According to yet another embodiment of the present invention, FIG. 15 is a perspective view of an electrical safety system for use with a decorative lighted Christmas tree, the system comprising a pole mounted molded electrical box 1505 secured to the rounded conductive metal trunk 1501 of a decorative lighted Christmas tree. Power is supplied to the decorative lighted Christmas tree from a 3-wire safety grounded plug 1502. The three-prong safety grounded plug 1502 provides hot wire 1506, neutral wire 1507 and safety ground wire 1508. Hot wire 1506 is electrically connected to circuit breaker 1517. Exiting the circuit breaker, hot wire 1506 and neutral wire 1507 terminate in polarized socket 1550. Tree light set leads 1534 exit the pole 1501 through insulating grommet 1532 which terminate in double fused power plug 1549 which powers tree light string leads 1534. A safety ground feature is provided by safety ground wire 1508 bonded to grounding strap 1504. Grounding strap 1504 is mounted to the rounded conductive metal trunk 1538 of the decorative lighted Christmas tree by star washer 1511 and tamper-proof screw 1509.

Figure 16:
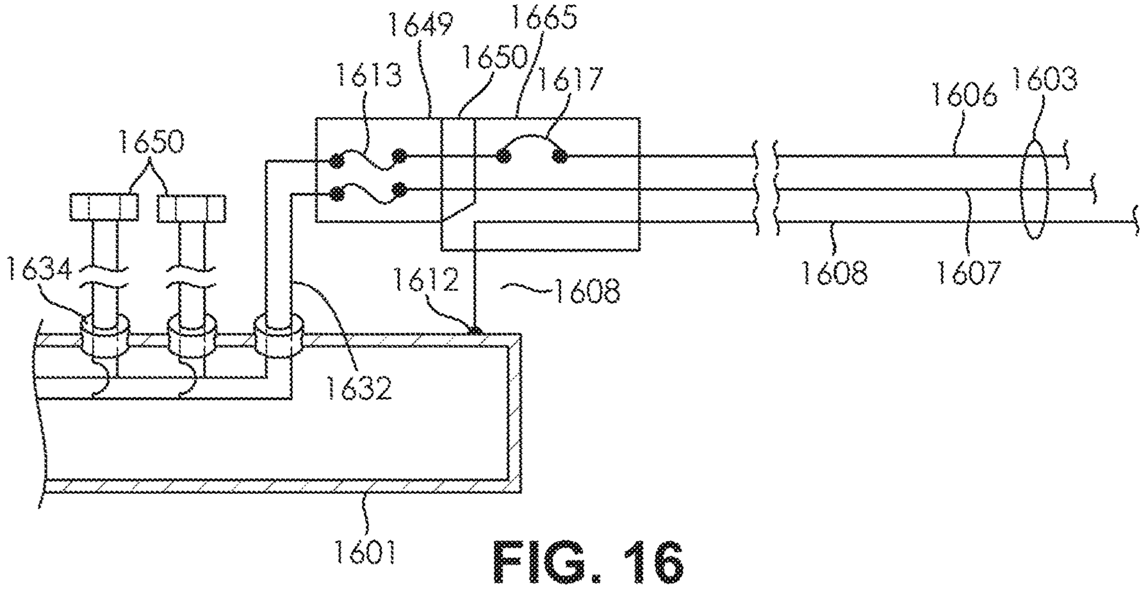
FIG. 16 shows a schematic diagram of a safety system for grounding a powered decorative tree according to the embodiment illustrated in FIG. 15 of the present invention.

FIG. 16 shows a schematic diagram the safety grounded decorative lighted Christmas tree according to the embodiment illustrated in FIG. 15. The 3-wire leads 1603 include hot wire 1606, neutral wire 1607 and ground wire 1608. Hot wire 1606 is connected to circuit breaker 1617. Hot wire 1606 and neutral wire 1607 exit circuit breaker 1617 to terminate in polarized socket 1650. Safety ground lead 1608 is bonded to the rounded conductive metal trunk 1601 at bonding point 1612. A doubly fused 1613 non-polarized plug 1649 is connected to non-polarized female socket 1680. The plug leads enter the rounded conductive metal trunk 1601 through insulated grommet 1632 and exit through insulated grommets 1634 and terminate externally into non-polarized sockets 1680.

Figure 17:
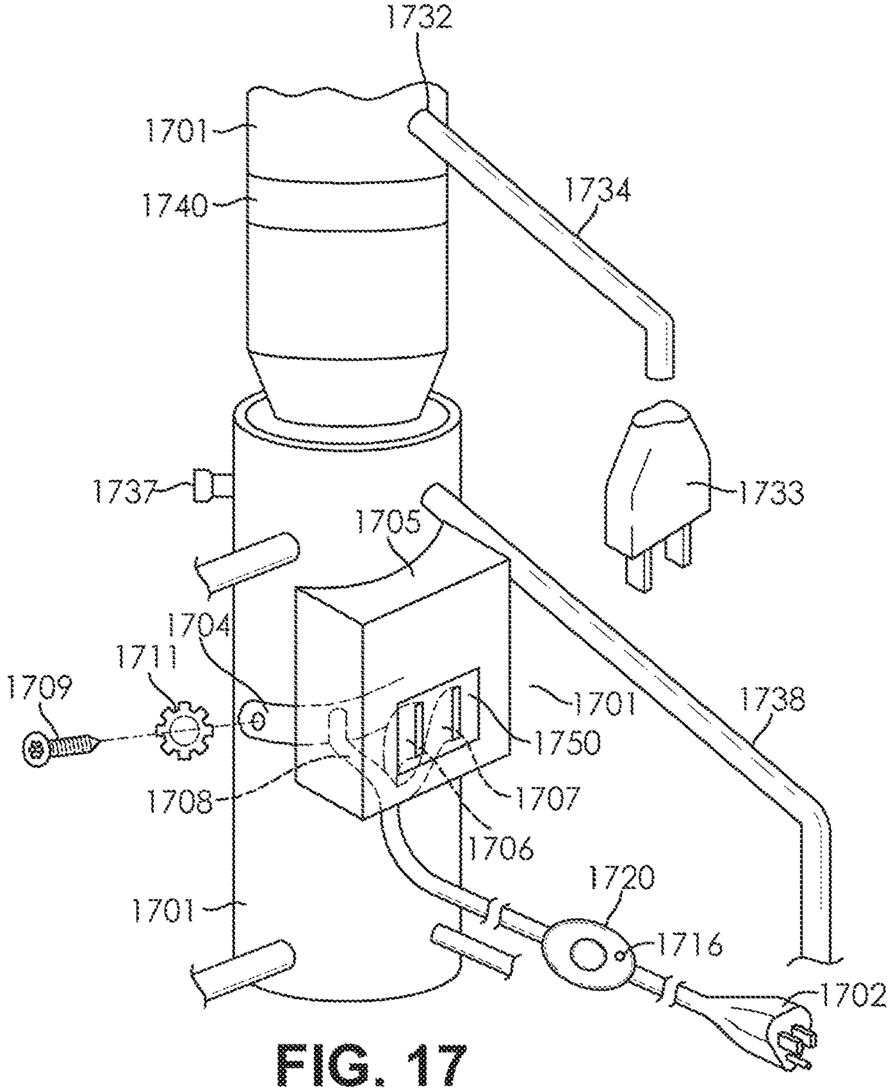
FIG. 17 is a perspective view of a pole mounted housing of the molded electrical box for securing the molded electrical box to the rounded conductive metal trunk of a decorative lighted Christmas tree, according to one embodiment.

According to some embodiments of the invention, FIG. 17 is a perspective view of an electrical safety system for use with a decorative lighted Christmas tree, the system comprising a pole mounted housing 1705 of the molded electrical box 1720 for securing the molded electrical box 1720 to the rounded conductive metal trunk 1701 of a decorative lighted Christmas tree. Power is supplied to the decorative lighted Christmas tree from a 3-wire safety grounded plug 1702. In the presently described embodiment, the three-prong safety grounded plug 1702 provides hot wire 1706, neutral wire 1707 and safety ground wire 1708 to a circuit breaker (not shown) located inside foot petal switch housing 1720. The three wires 1706, 1707 and 1708 all exit the foot petal switch housing 1720 with hot wire 1706 and neutral wire 1707 terminating in polarized socket 1750. The foot petal switch housing 1720 further includes reset button 1716 shown at the top of the housing 1720. A safety ground feature is provided by safety ground wire 1708 bonded to grounding strap 1704 by terminating in star washer 1711 which is mounted to the rounded conductive metal trunk 1701 of the decorative lighted Christmas tree by tamper proof screw 1709. Polarized socket 1750 may be used to power tree light string leads 1734 which terminate in power plug 1733.

Figure 18:
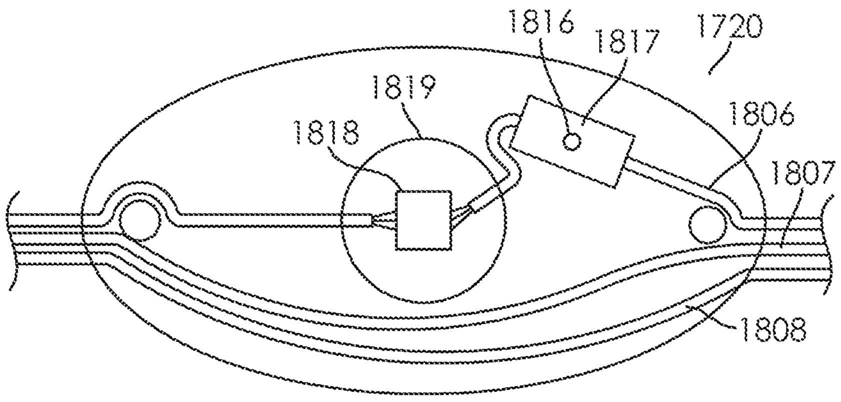
FIG. 18 best illustrates various electronic components provided in the foot petal switch housing of FIG. 17.

FIG. 18 is a detailed view of foot petal switch housing 1730 of FIG. 17 which best illustrates various electronic components provided in the foot petal switch housing 1720 of FIG. 17. The hot wire 1806 of the 3-wire safety grounded plug 1702 is connected to circuit breaker 1817. Reset button 1816 is connected to foot petal switch 1818 and its button 1819. Neutral lead 1807 and safety ground lead 1808 pass through foot petal switch housing 1720 and terminate in polarized socket 1750 as shown in FIG. 17.

Figure 19:
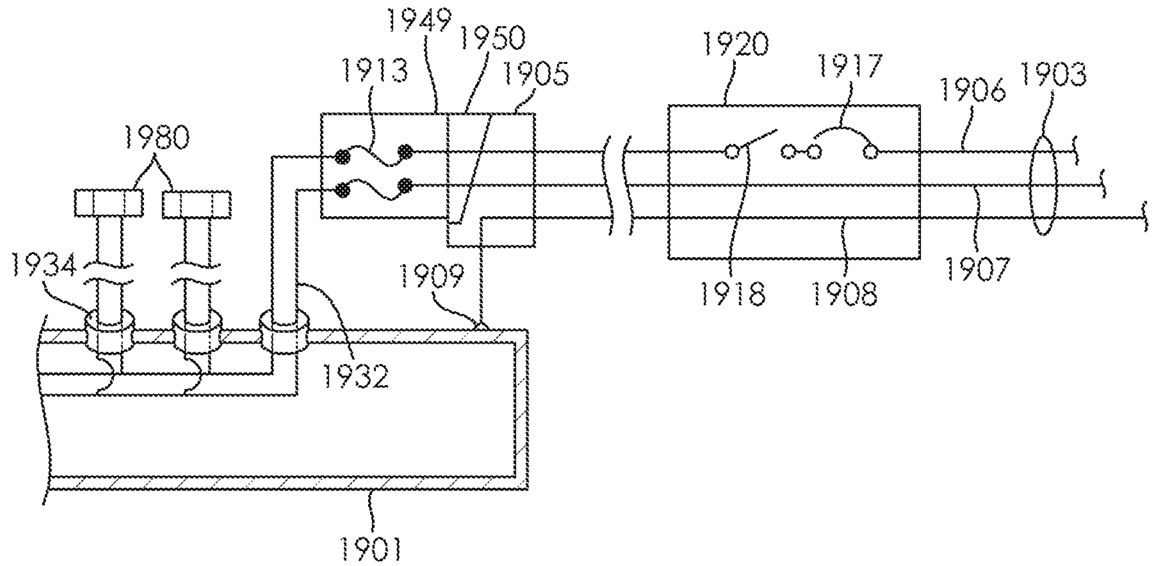
FIG. 19 shows a schematic diagram of a system for grounding a powered decorative tree according to the embodiment illustrated in FIG. 17 of the present invention.

FIG. 19 shows a schematic diagram of the safety grounded decorative lighted Christmas tree according to the embodiment illustrated in FIGS. 17 and 18. The 3 wire leads 1903 include hot wire 1906, neutral wire 1907 and ground wire 1908, which are routed through foot petal switch housing 1920 which includes foot petal switch 1918. Inside the housing 1920, hot wire 1906 is wired to circuit breaker 1917. The circuit breaker 1917 is connected in series with foot petal switch 1918. This schematic diagram is otherwise identical to the schematic diagram shown in FIG. 16. The hot wire 1906, neutral wire 1907, (remove ground wire 1908, and) go into molded housing 1905 and connect to the polarized connector 1950. Ground wire 1908 goes into the molded housing 1905 and connects to the metal pole 1901 at bounding point 1909. A doubly fused 1913 non-polarized plug 1949 wires are then enter the pole through the grommet 1932 and out again through grommets 1934 and terminate at non-polarized sockets 1980.

Figure 20:
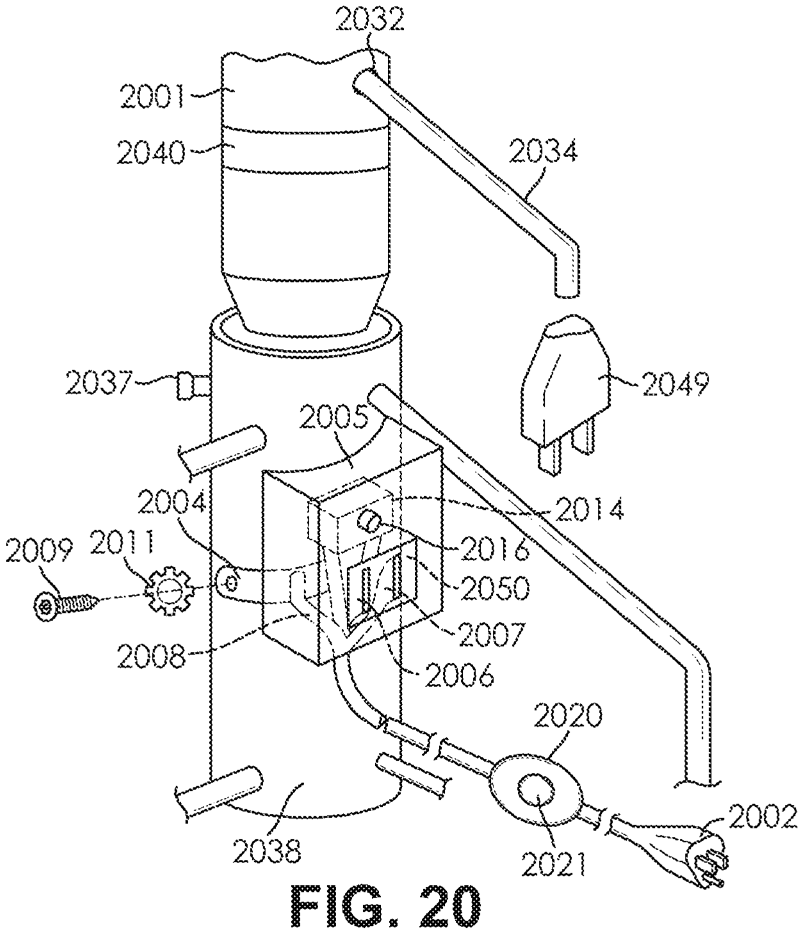
FIG. 20 shows a system for powering a decorative tree including a tree-mounted power cord with a non-standard fused three-prong polarized male electrical plug which attaches to and grounds the powered decorative tree, according to some embodiments of the present invention.

According to some embodiments of the present invention, FIG. 20 is a perspective view of an electrical safety system for use with a decorative lighted Christmas tree, the system comprising a pole mounted housing 2005 of the molded electrical box for securing the molded electrical box to the rounded metal tree stand 2038 of a decorative lighted Christmas tree. Power is supplied to the decorative lighted Christmas tree from a 3-wire safety grounded plug 2002. In the present embodiment, circuit breaker 2014 and outlet polarized socket 2050 are located inside the pole mounted housing 2005. In contrast with previously described embodiments in which the foot petal housing 2020 houses both the foot petal switch and the circuit breaker, in the presently described embodiment, the foot petal switch housing 2020 houses only the foot petal switch 2021. The three-prong safety grounded plug 2002 provides hot wire 2006, neutral wire 2007 and ground wire 2008 to the foot petal switch housing 2020 with hot wire 2006 wired to the foot petal switch 2021. As described in prior embodiments, a safety ground feature is provided by a safety ground wire 2008 bonded to grounding strap 2004 by terminating in star washer 2011 which is mounted to the rounded conductive metal trunk of the decorative lighted Christmas tree. Polarized Socket 2050 may be used to power tree light string leads 2034 which terminates in power plug 2049.

Figure 21:
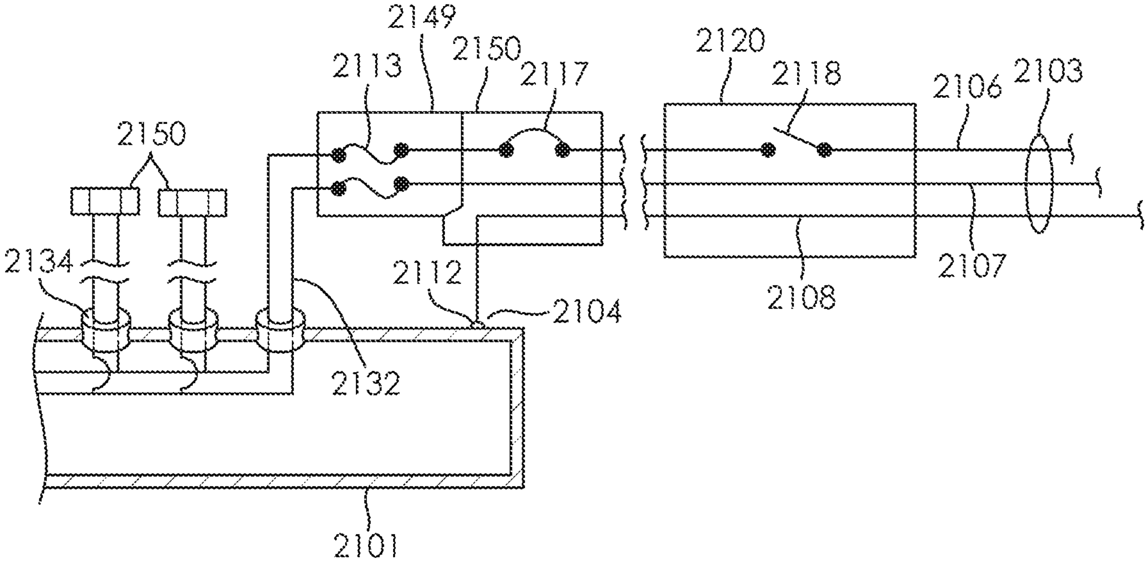
FIG. 21 shows a schematic diagram of a system for grounding a powered decorative tree according to the embodiment illustrated in FIG. 20 of the present invention.

FIG. 21 shows a schematic diagram the safety grounded decorative lighted Christmas tree according to the embodiment illustrated in FIG. 20. The 3 wire leads 2103 including hot wire 2106, neutral wire 2107 and ground wire 2108 which are routed through foot petal switch housing 2120 which includes foot petal switch 2118 which controls power to the decorative lighted Christmas tree. Switched hot wire 2106 exits foot petal switch 2118 and terminates in circuit breaker 2117. A doubly fused 2113 non-polarized plug 2149 is connected to female polarized socket 2150. The plug leads enter the rounded conductive metal trunk 2101 through insulated grommet 2132 and exit through insulated grommets 2134 and terminate externally into non-polarized sockets 2180.

Figure 22:
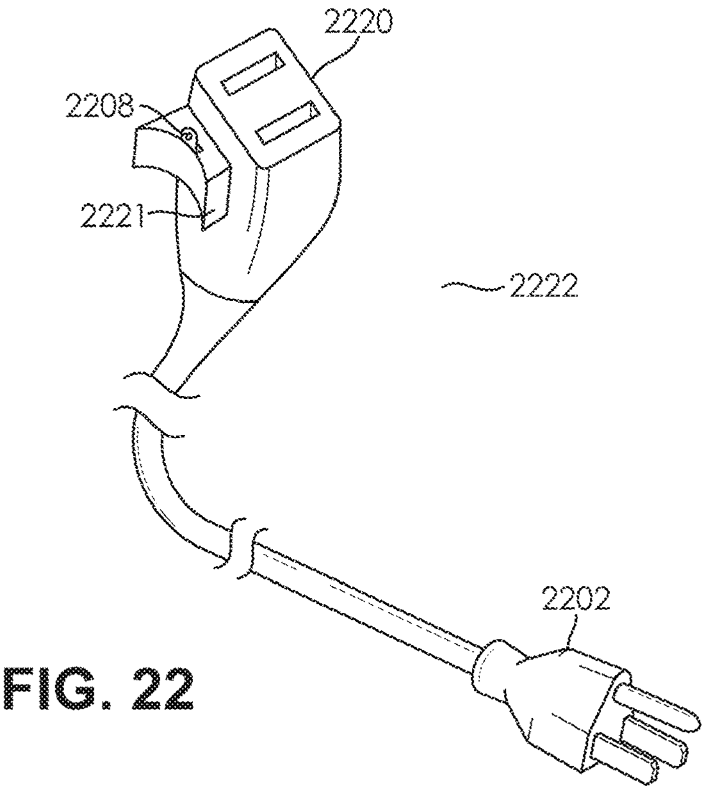
FIG. 22 shows a non-standard 3-wire safety grounded power cord as shown in FIGS. 3, 23, 29 and 34.

According to some embodiments of the present invention, FIG. 22 is a perspective view of an electrical safety system comprising a modified power cord 2222 with a three-prong safety grounded plug 2202 on the male end and a modified female socket 2220 on the female end. The ground wire female terminal of the modified female power socket 2220 is replaced with a ground eyelet terminal 2208.

Figure 23:
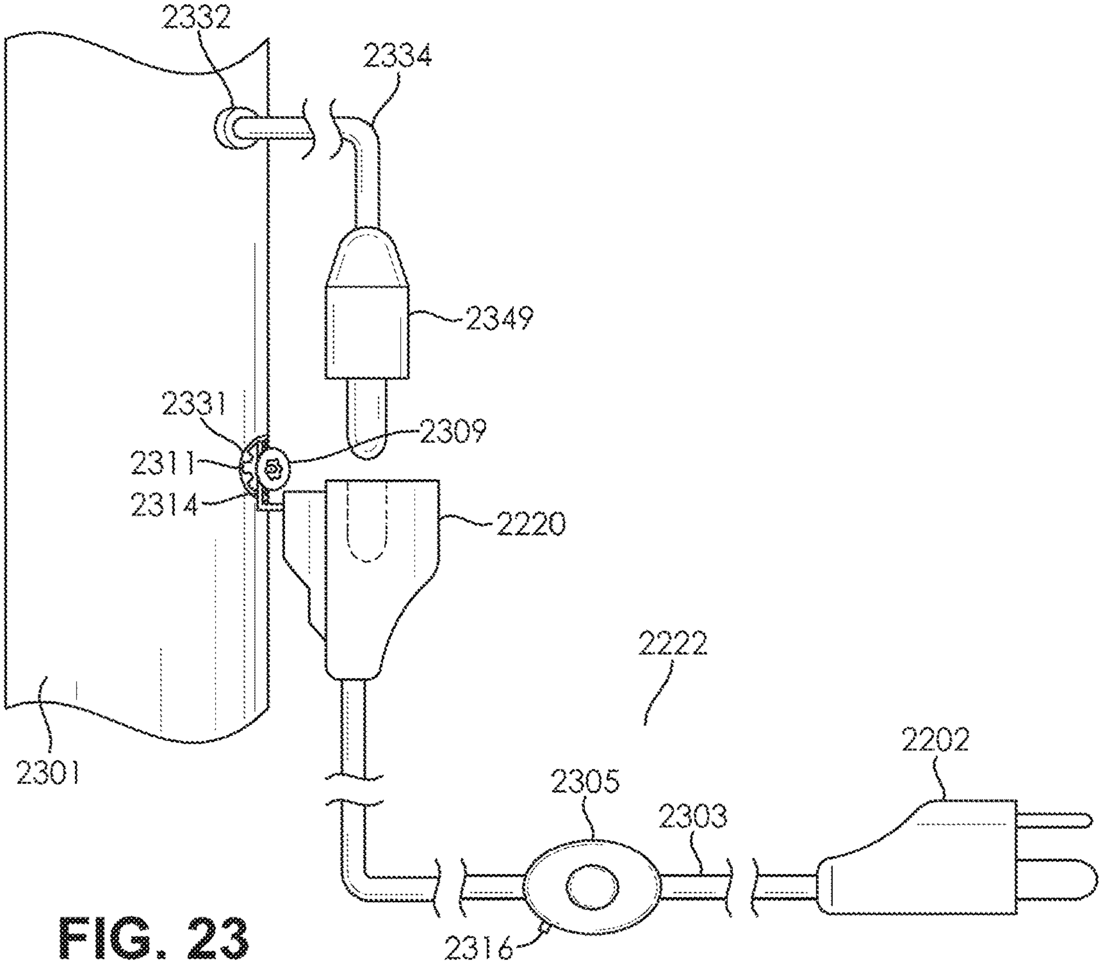
FIG. 23 shows the modified power cord attached to a bare metal ground point on the conductive trunk of the decorative lighted Christmas tree by a tamper-proof screw and a star washer.

FIG. 23 shows a safety system for use with a decorative lighted Christmas tree comprising the modified power cord 2222 of FIG. 22 that is shown attached to a bare metal ground point 2331 on the conductive trunk 2301 of the decorative lighted Christmas tree by a tamper-proof screw 2309 and a star washer 2311. According to one embodiment, the ground eyelet terminal 2314 is bent at two 90 degree angles so that it lines up flush with the conductive trunk 2301 and the molded base 2221 of the modified female polarized socket 2220. As shown in FIG. 22, the molded base 2221 of the female end of the modified power cord is curved to fit the rounded trunk 2301 of the decorative lighted Christmas tree. A circuit breaker (not shown) is located inside the foot petal switch housing 2305. An important feature of the modified power cord depicted in FIGS. 22 and 23 is that the ground connection can be made independently of the hot and neutral connection (through the standard plug) without interfering with the ability of the standard plug to be plugged in and removed from the female end of the modified power cord. One way of achieving this is by placing the ground connection on a surface other than the first surface where the female polarized socket is placed. A non-polarized double fused plug 2349 plugs into the modified female polarized socket 2220 and the power wires 2334 of the plug 2349 enter the trunk of the decorative lighted Christmas tree through a securing grommet 2332. Power is distributed within the tree to various, connectors, and/or light strings on the decorative lighted Christmas tree.

Figure 24:
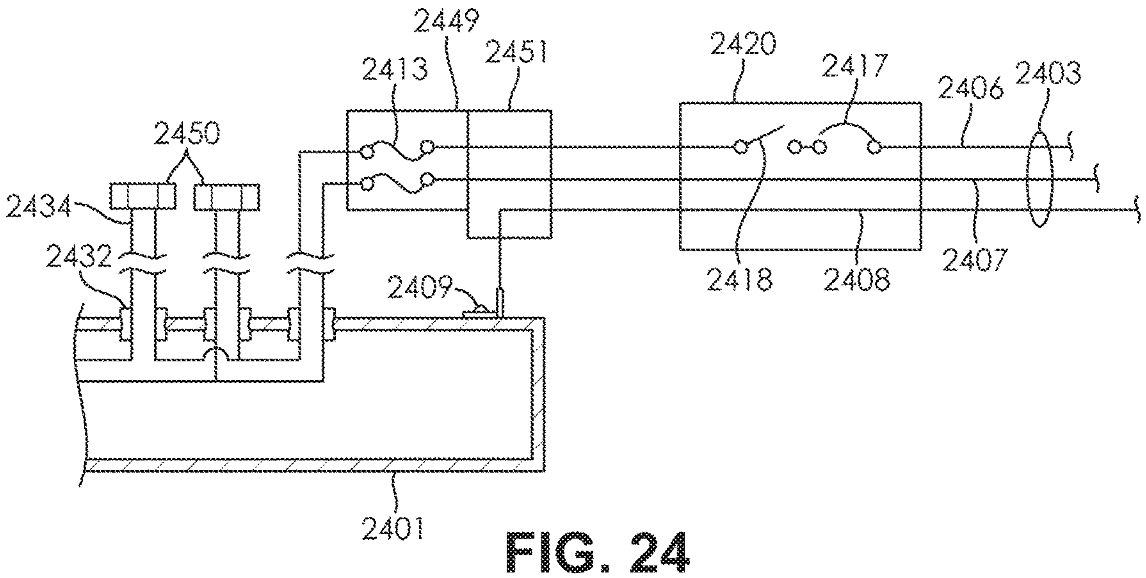
FIG. 24 shows a schematic diagram of a system for grounding a powered decorative tree according to the embodiment illustrated in FIG. 23 of the present invention.

FIG. 24 shows a schematic diagram the safety grounded decorative lighted Christmas tree according to the embodiments illustrated in FIGS. 22 and 23. This schematic diagram is similar to the schematic diagram shown in FIG. 19 in most respects except, instead of the safety ground lead being bonded to the rounded conductive metal trunk at bonding point 1909, polarized socket 2450 attaches to the rounded conductive metal trunk 2401 by safety lead terminal 2409.

Figure 25:
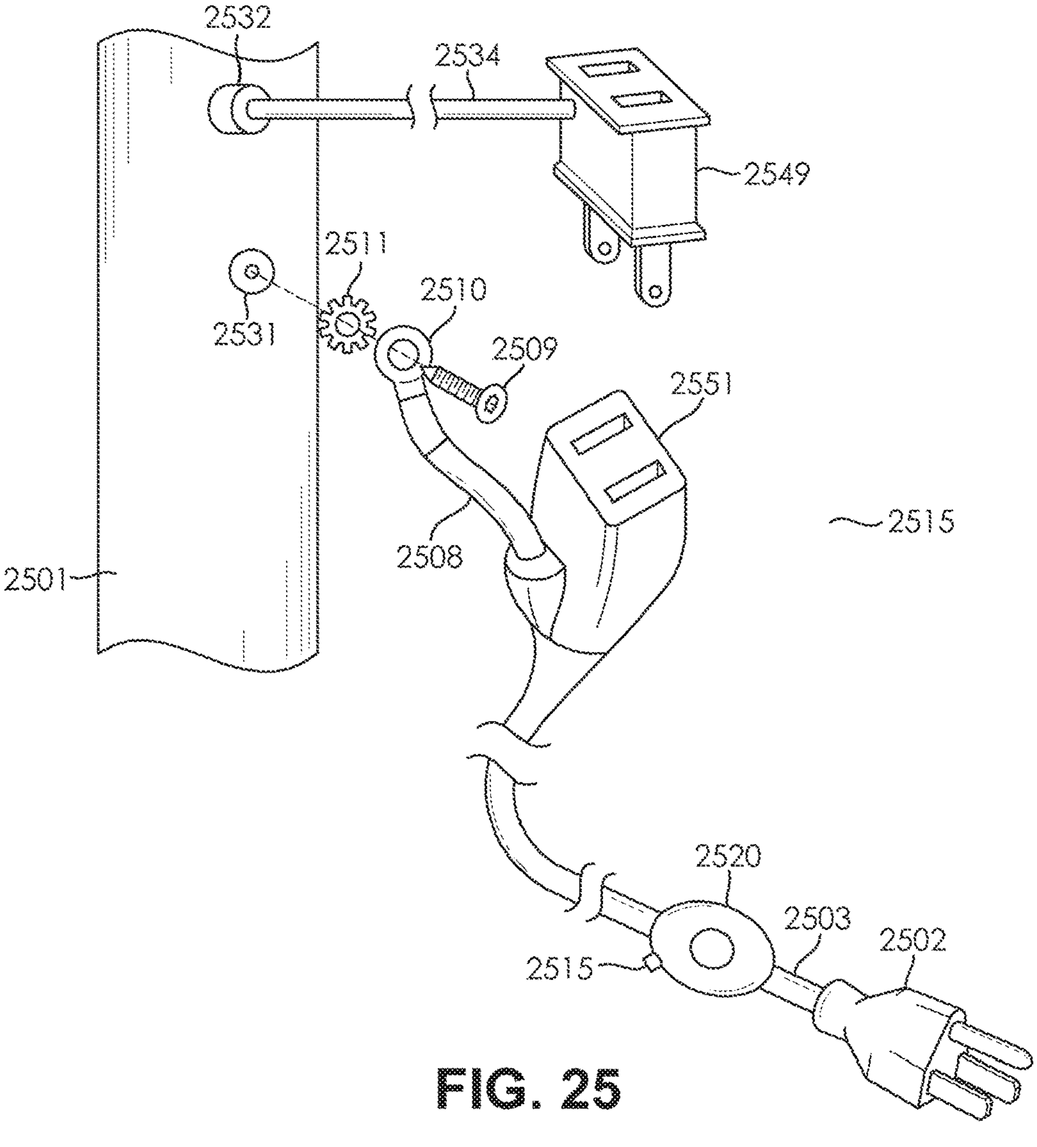
FIG. 25 shows a system for powering a decorative tree, according to some embodiments of the present invention.

According to some embodiments of the present invention, FIG. 25 is a perspective view of a modified power cord 2550 with a three-prong safety grounded plug 2502 on the male end and a modified female polarized socket 2551 on the female end. In the presently described embodiment, the three-prong safety grounded plug 2502 provides, inside cable 2503, hot wire (not shown), neutral wire (not shown) and safety ground wire 2508 to a circuit breaker (not shown) located inside foot petal switch housing 2520. The three wires all exit the housing with hot wire and neutral wire terminating in polarized socket 2551. The housing 2520 further includes reset button 2515 shown at the top of the housing 2520. A safety ground feature is provided by safety ground wire 2508 terminating in a ring terminal 2510 which attaches to a bare metal ground point 2531 on the rounded conductive trunk 2501 of the decorative lighted Christmas tree by a tamper-proof screw 2509 and a star washer 2511.

Figure 26:
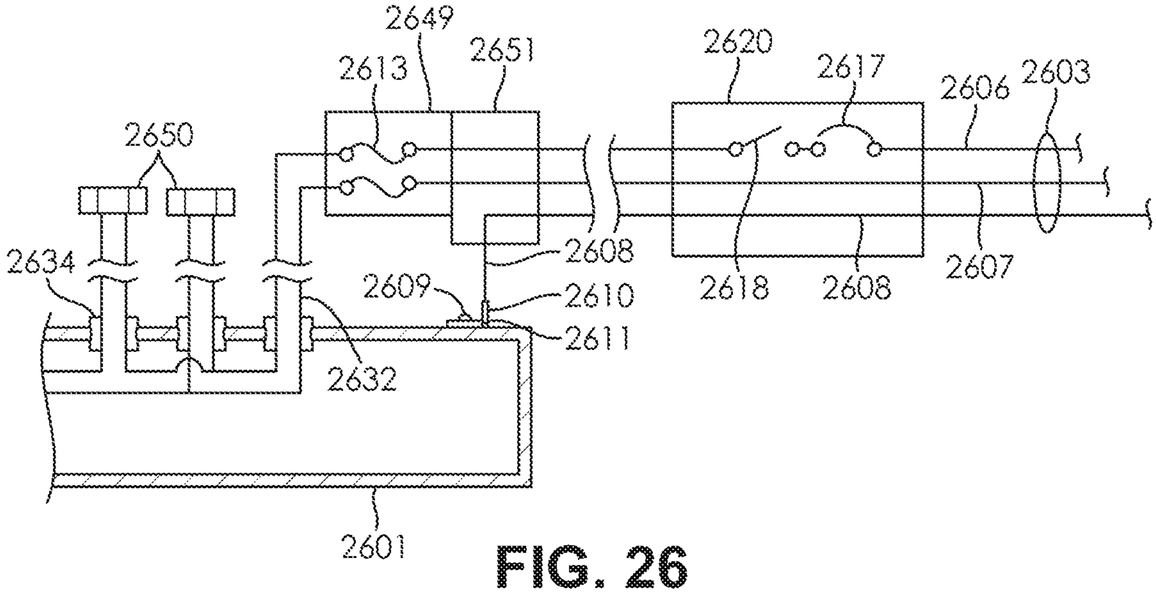
FIG. 26 shows a schematic diagram of a safety system for grounding a powered decorative tree according to the embodiment illustrated in FIG. 25 of the present invention.

FIG. 26 shows a schematic diagram the safety grounded decorative lighted Christmas tree according to the embodiment illustrated in FIG. 25. The 3-wire leads 2603 include hot wire 2606, neutral wire 2607 and ground wire 2608. Hot wire 2606 is wired to circuit breaker 2617. Hot wire 2606 and neutral wire 2607 exit foot petal housing 2620 which includes switch 2618 to terminate in female polarized socket 2651. Doubly fused 2613 non-polarized plug 2649 is connected to female polarized socket 2651. The plug leads enter the rounded conductive metal trunk 2601 through insulated grommet 2632 and exit through insulated grommets 2634 and terminate externally into non-polarized sockets 2650. A safety ground feature is provided by safety ground wire 2608 terminating in a ring terminal 2610 which attaches to a bare metal ground point on the rounded conductive trunk 2601 of the decorative lighted Christmas tree by a tamper-proof screw 2609 and a star washer 2611.

Figure 27:
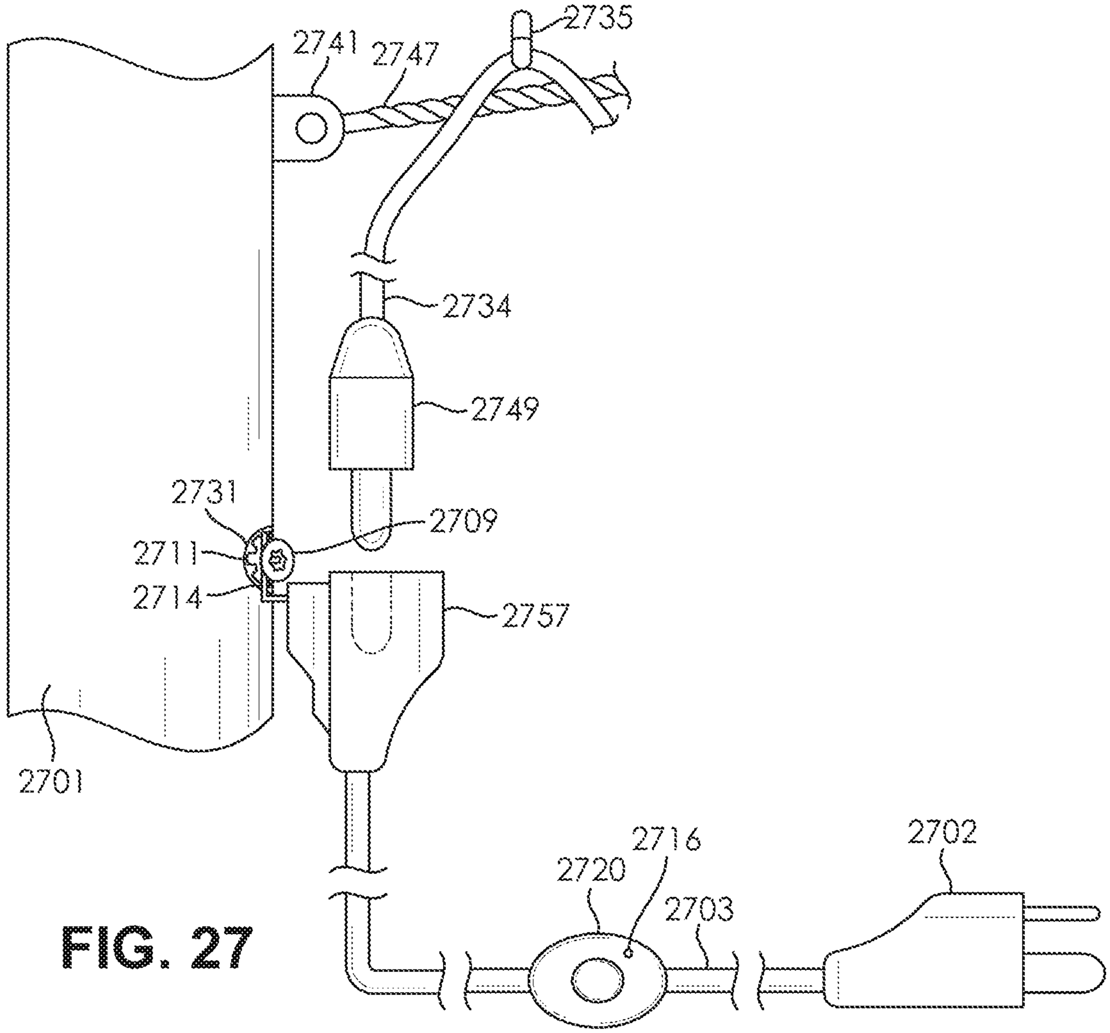
FIG. 27 shows the modified power cord and attachment scheme of FIG. 23 and additionally shows an externally wired grounded pole attachment.

According to some embodiments of the present invention, FIG. 27 is a perspective view of a modified power cord 2222 of FIG. 22 similar to the embodiment shown in FIG. 23. However, unlike the embodiment shown in FIG. 23, the presently described embodiment shown in FIG. 27 illustrates that the grounding configuration described above with respect to FIG. 23 is configured to handle both internal faults and external faults, which can derive from any branch hinge supports 2741 that may be coupled to the decorative lighted Christmas tree 2701 and/or externally wired branches 2747.

In all of the described embodiments, including the present embodiment, internal/external faults, may arise from unknown sources are overcome by the present invention. For example, an event may occur where the hot wire 2706 comes in contact with an unknown source such as, for example, without limitation, the metal pole 2701 or any of its metal component parts causing the metal pole or parts to be electrically hot with the pole. Advantageously, according to embodiments of the invention, a safety circuit, such as, for example, safety circuit 2708 grounds the undesirable hot metal parts thereby preventing a person or flammable material to become a conductive current carrier from the hot circuit to ground.

Figure 28:
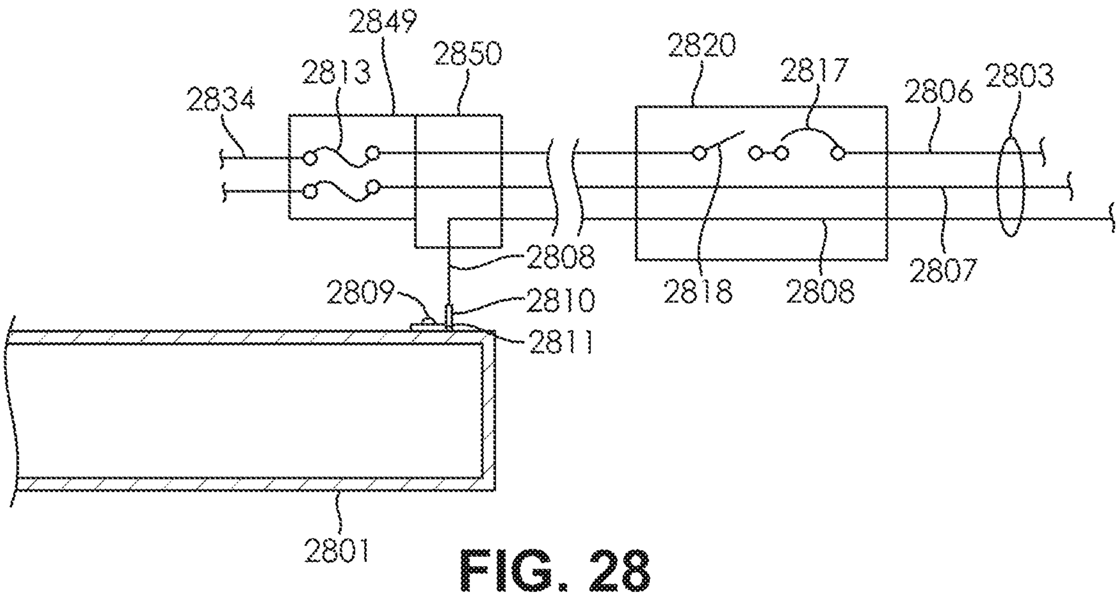
FIG. 28 shows a schematic diagram of a safety system for grounding a powered decorative tree according to the embodiment illustrated in FIG. 27 of the present invention.

FIG. 28 shows a schematic diagram the safety grounded decorative lighted Christmas tree according to the embodiment illustrated in FIG. 27. The 3-wire leads 2803 include hot wire 2806, neutral wire 2807 and ground wire 2808. Hot wire 2806 is wired to circuit breaker 2817. Hot wire 2806 and neutral wire 2807 exit foot petal housing 2820, which includes foot switch 2618, to terminate in female polarized socket 2850. Doubly fused 2813 non-polarized plug 2849 is connected to female polarized socket 2850. The plug leads 2834 of the doubly fused 2813 non-polarized plug 2849 go to decorative light strings in the decorative lighted Christmas tree. A safety ground feature is provided by safety ground wire 2808 terminating in a ring terminal 2810 which attaches to a bare metal ground point on the rounded conductive trunk 2801 of the decorative lighted Christmas tree by a tamper-proof screw 2809 and a star washer 2811.

Figure 29:
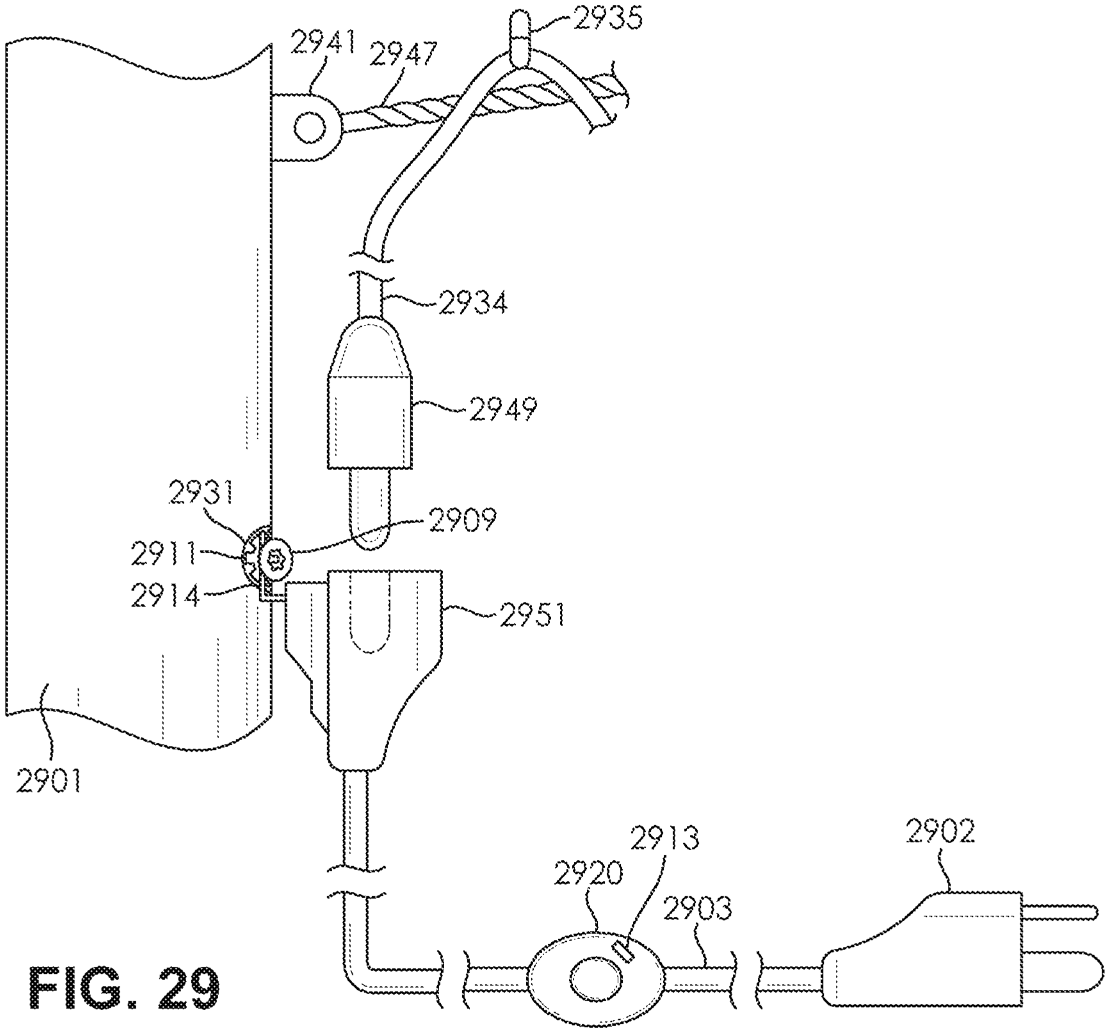
FIG. 29 shows a safety system for powering a decorative tree, according to some embodiments of the present invention.

FIG. 29 shows an electrical safety system comprising a modified power cord and novel grounding configuration according to some embodiments of the invention. The modified power cord similar to what is shown in FIGS. 22 and 27 except that in the present embodiment, a circuit breaker 2920 is replaced with an internal fuse (not shown). The modified power cord of FIG. 29 has a novel grounding configuration comprising a non-polarized fused plug 2949 configured to prevent both internal faults and external faults caused by metal attachments to the decorative lighted Christmas tree from various sources including, for example, branch hinge supports 2941 and externally wired branches 2947.

Figure 30:
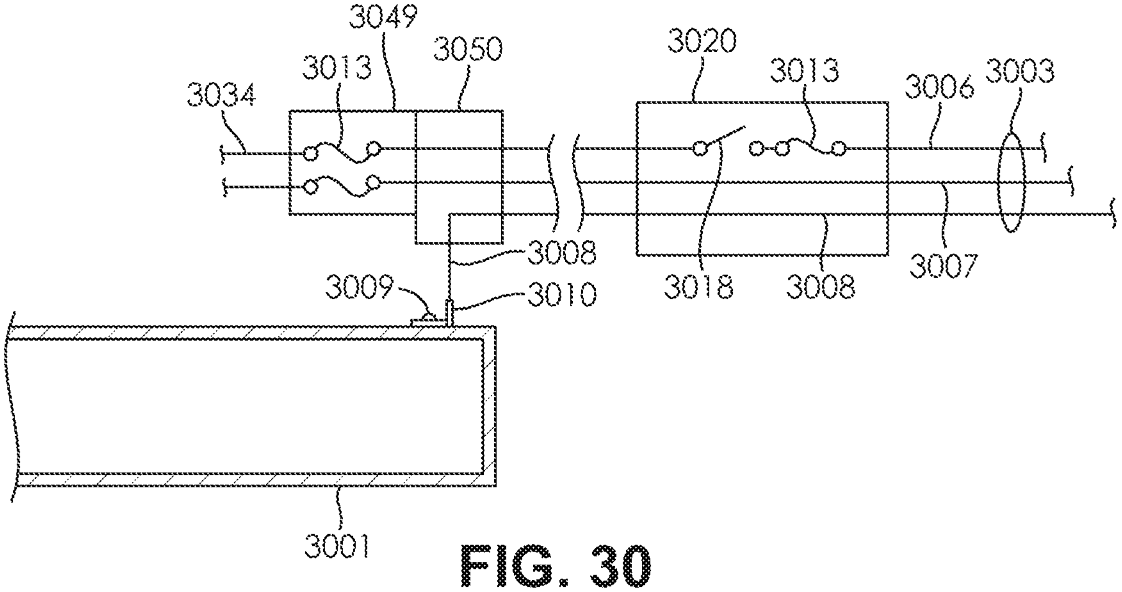
FIG. 30 shows a schematic diagram of a safety system for grounding a powered decorative tree according to the embodiment illustrated in FIG. 29 of the present invention.

FIG. 30 shows a schematic diagram of the safety grounded decorative lighted Christmas tree according to the embodiment illustrated in FIG. 29. The 3-wire leads 3003 include hot wire 3006, neutral wire 3007 and ground wire 3008. Hot wire 3006 is wired to fuse 3013 located in the foot pedal housing 3020. Hot wire 3006 and neutral wire 3007 exit the foot petal housing 3020, which includes foot switch 3018, to terminate in female polarized socket 3050. Doubly fused 3013 non-polarized plug 3049 is shown connected to female polarized socket 3050. The plug leads 3034 of the non-polarized plug 3049 go to decorative light strings (not shown) in the decorative lighted Christmas tree. A safety ground feature is provided by safety ground wire 3008 terminating in a ring terminal 3010 which attaches to a bare metal ground point on the rounded conductive trunk 3001 of the decorative lighted Christmas tree by a tamper-proof screw 3009 and a star washer 3011.

Figure 31:
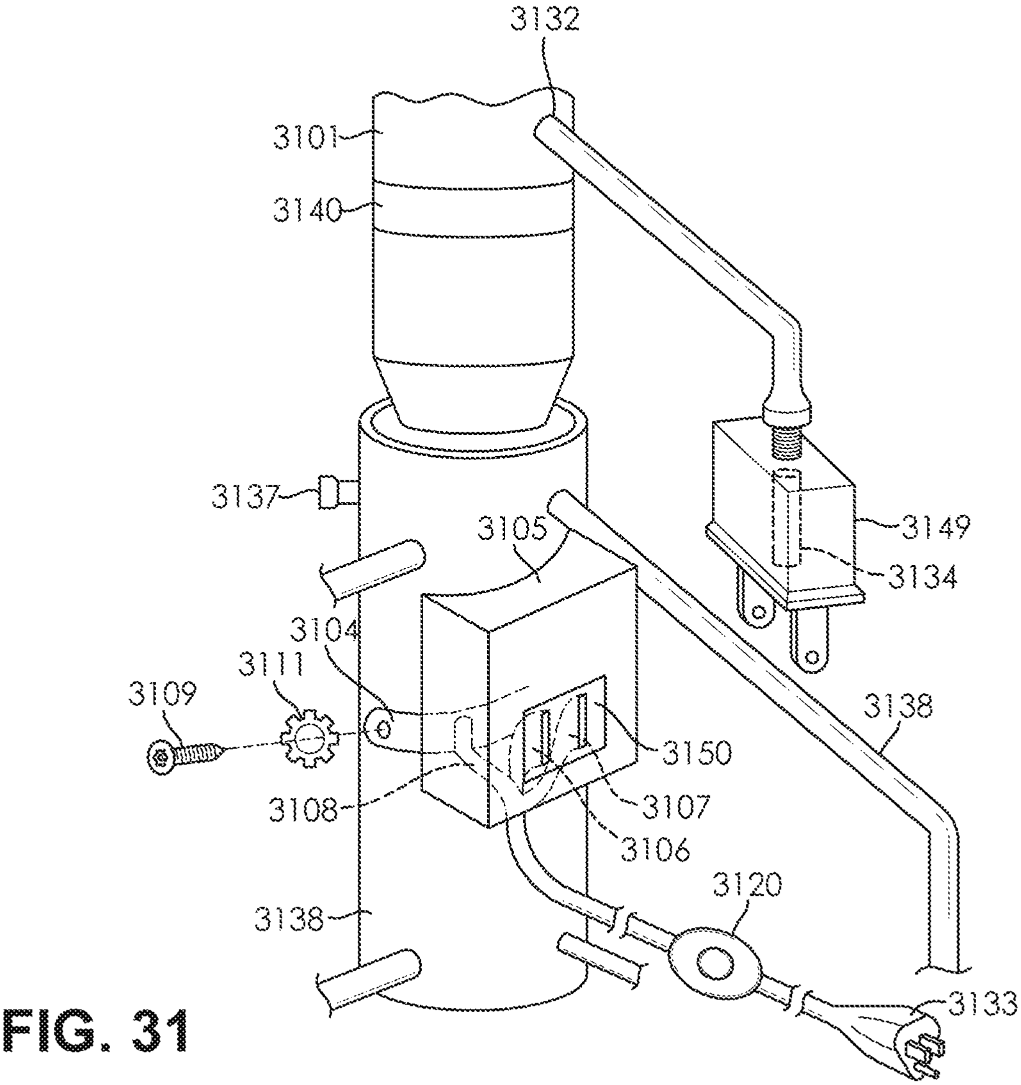
FIG. 31 shows the modified power cord and attachment scheme of FIG. 17 and additionally shows an externally wired grounded pole attachment.

FIG. 31 is a perspective view of an electrical safety system for use with a decorative lighted Christmas tree, the system comprising a pole mounted molded electrical box 3105 for securing the molded electrical box 3105 to the rounded conductive metal trunk 3101 of a decorative lighted Christmas tree. Power is supplied to the decorative lighted Christmas tree from a fused 3-wire safety grounded plug 3133 that provides hot wire 3106, neutral wire 3107 and safety ground wire 3108 to a single pole switch (not shown) located inside foot petal switch housing 3120. The three wires 3106, 3107, 3108 all exit the foot petal switch housing 3120 with the hot wire 3106 and neutral wire 3107 terminating in polarized socket 3150. In the presently described embodiment, a Hi to Low Voltage AC to DC adapter 3134 embedded within the male electrical plug 3149 is configured to be plugged into the polarized female socket 3150 to power LED light string (not shown). A safety ground feature is provided by safety ground wire 3108 bonded to grounding strap 3104 by terminating in star washer 3111 which is mounted to the rounded conductive metal trunk 3101 of the decorative lighted Christmas tree by tamper proof screw 3109.

Figure 32:
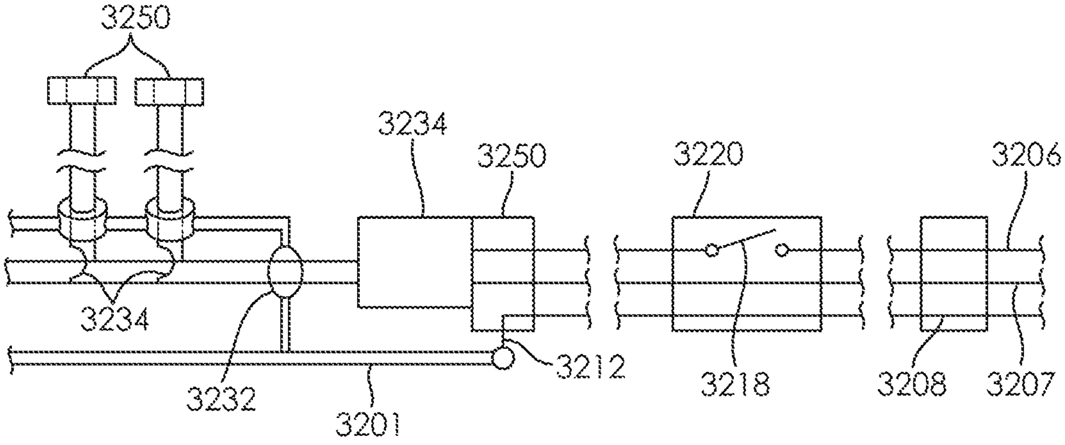
FIG. 32 shows a schematic diagram of a safety system for grounding a powered decorative tree according to the embodiment illustrated in FIG. 31 of the present invention.

FIG. 32 shows a schematic diagram the safety grounded decorative lighted Christmas tree according to the embodiment illustrated in FIG. 31. The 3-wire leads include hot wire 3206, neutral wire 3207 and safety ground wire 3208. Hot wire 3206 is connected to single pole switch 3218 located inside of foot pedal switch housing 3220. Hot wire 3206, neutral wire 3207 and safety ground wire 3208 exit the single pole switch 3218 and terminate in polarized socket 3250 with the ground wire terminating at the pole 3212. Safety ground wire 3208 is bonded to the rounded conductive metal trunk 3201 at bonding point 3212. A high to low voltage AC to DC adapter 3234 is configured to be connected to female polarized socket 3250. The DC wires of the AC/DC high to low voltage adapter 3234 exit the high to low voltage adapter 3234 and enter the rounded conductive metal trunk 3201 through insulated grommet 3232 and exit through two insulated grommets 3234 and terminate externally into DC connectors 3250. Low voltage DC Power is distributed within the Christmas tree from the DC polarized connectors 3250 to various connectors, and/or light strings on the decorative lighted Christmas tree.

Figure 33:
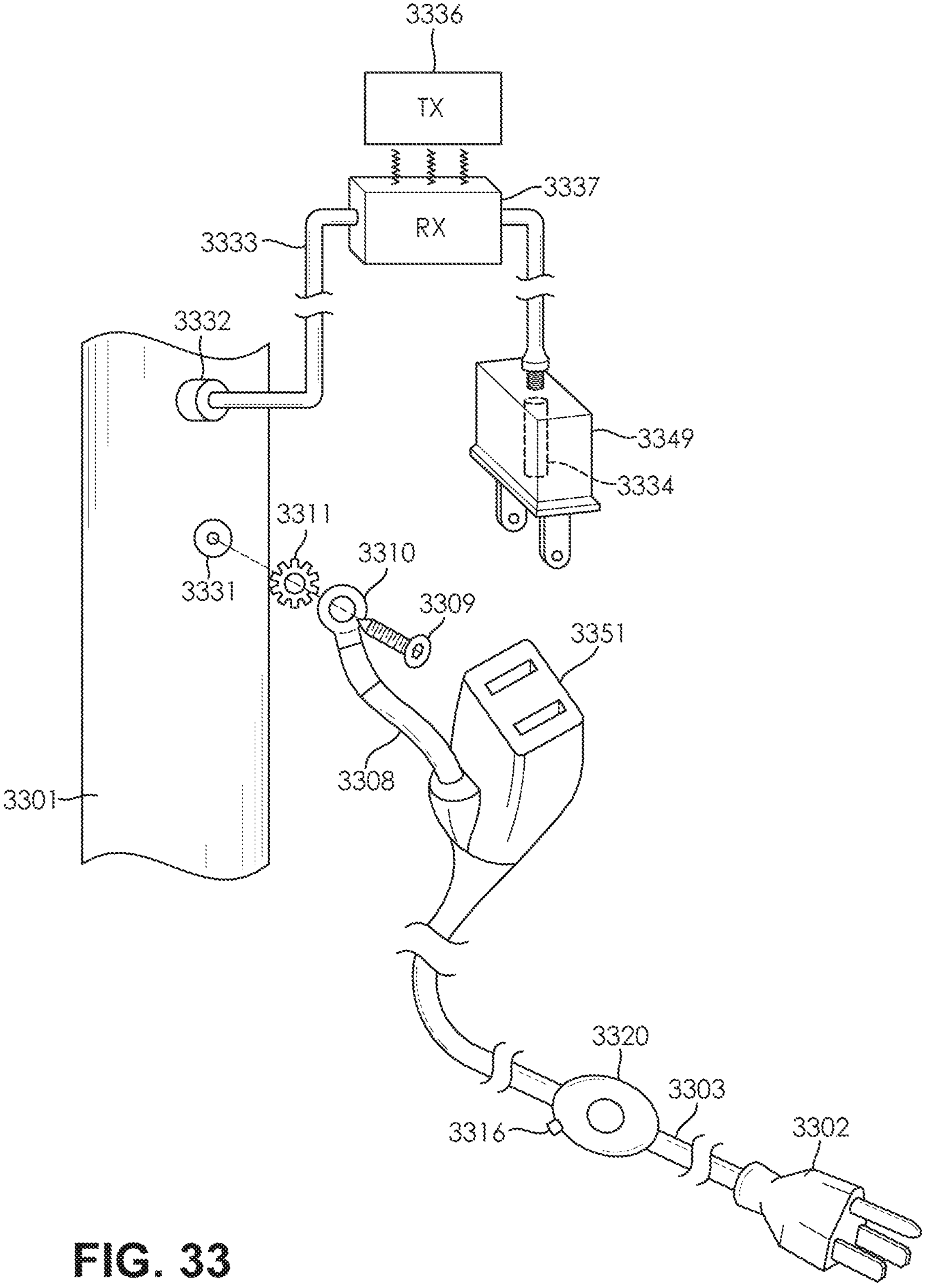
FIG. 33 shows a safety system for powering a decorative tree, according to some embodiments of the present invention.

According to some embodiments of the present invention, FIG. 33 is a perspective view of one embodiment of an electrical safety system for use with a decorative lighted Christmas tree, the system comprising a modified power cord 3303 with a three-prong safety grounded plug 3302 on the male end and a modified female polarized socket 3351 on the female end. In the presently described embodiment, the three-prong safety grounded plug 3302 provides, three wires inside cable 3303, including hot wire (not shown) connected to a circuit breaker (not shown), neutral wire (not shown) and safety ground wire 3308 located inside foot petal switch housing 3320. The three wires enter and exit the foot petal switch housing 3320 with the hot wire and neutral wire exiting the housing 3320 to terminate in the modified female polarized socket 3351. The foot petal switch housing 3320 further includes reset button 3316 located on a front face. A safety ground feature is provided by safety ground wire 3308 terminating in a ring terminal 3310 which attaches to a bare metal ground point 3331 on the rounded conductive trunk 3301 of the decorative lighted Christmas tree by a tamper-proof screw 3309 and a star washer 3311. In the presently described embodiment, a high to low voltage AC to DC adapter 3334 embedded within the male electrical plug 3349 is configured to be plugged into the modified female polarized socket 3351. A further feature of the present embodiment concerns the remote-control device TX/RX 3336, 3337 which provides users with a capability to remotely change the LED patterns of decorative light strings in the decorative lighted Christmas tree. The remote control device TX/RX 3336, 3337 is positioned in series with the power wires 3333 of the male electrical plug 3349 that enter the trunk of the decorative lighted Christmas tree trunk 3301 through a securing grommet 3332. Low voltage DC Power is distributed within the Christmas tree to various connectors, and/or light strings on the decorative lighted Christmas tree.

Figure 34:
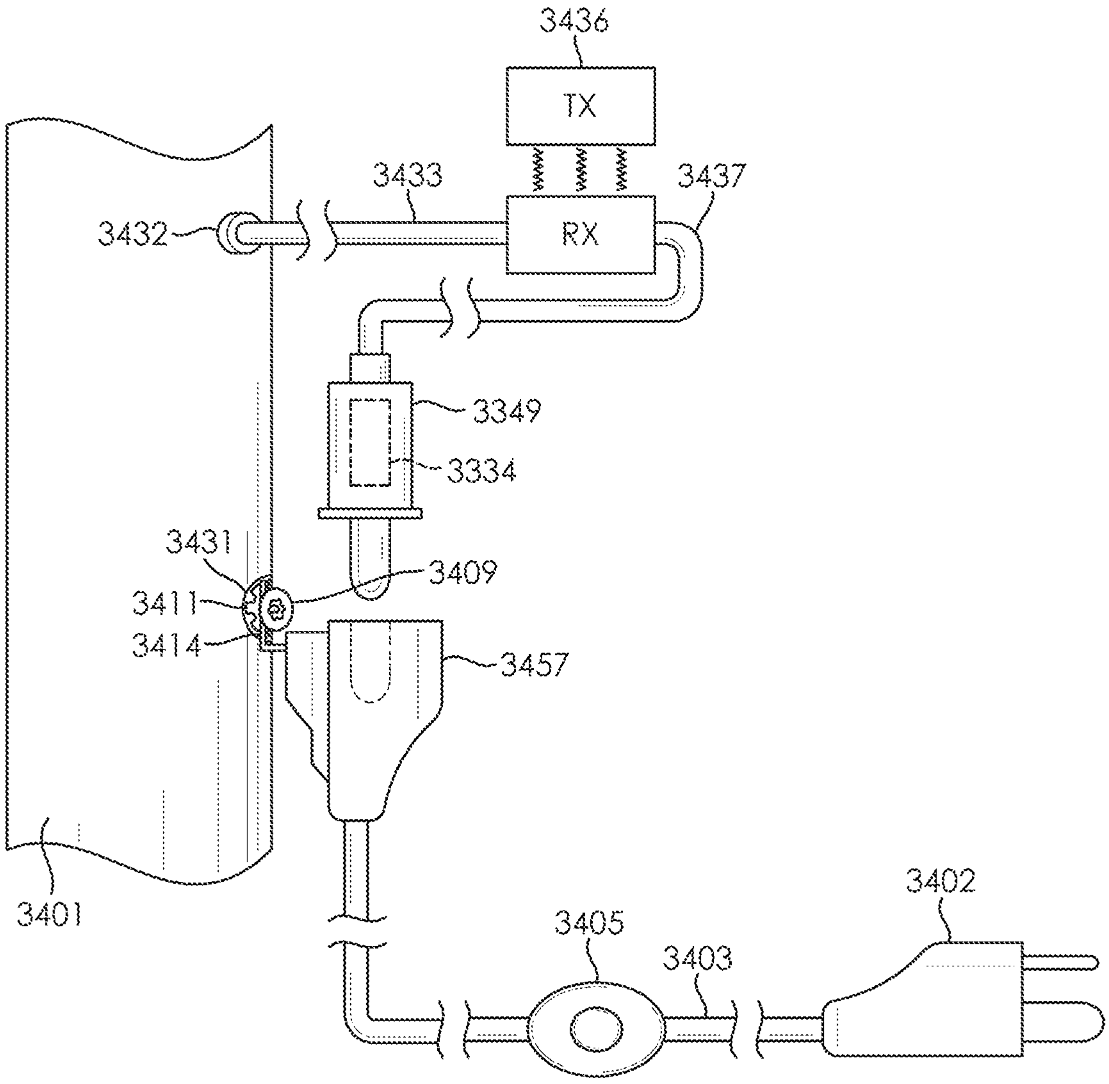
FIG. 34 shows a schematic diagram of a safety system for grounding a powered decorative tree according to the embodiment illustrated in FIG. 29 of the present invention.

FIG. 34 shows one embodiment of an electrical safety system for use with a decorative lighted Christmas tree, the system comprising a modified power cord 3403, such as the one shown in FIG. 22. The modified power cord 3403 is attached to a bare metal ground point 3431 on the conductive trunk 3401 of the decorative lighted Christmas tree by a tamper-proof screw 3409 and a star washer 3411. The ground eyelet terminal 3414 is bent at two 90 degree angles so that it lines up flush with the conductive trunk 3401 and the molded base 3421 of the modified female polarized socket 3420. As shown in FIG. 22, the molded base of the female end of the modified power cord is curved to fit the rounded trunk 3401 of the decorative lighted Christmas tree. A fuse (not shown) is located inside the foot petal switch housing 3405. An important feature of the modified power cord is the remote control device TX/RX 3436, 3437 which provides users with a capability to remotely change the LED patterns of decorative light strings in the decorative lighted Christmas tree. The remote control device TX/RX 3436, 3437 is inserted in series with the power wires 3433 of the high to low voltage AC/DC adapter 3434 that enter the trunk of the decorative lighted Christmas tree trunk 3301 through a securing grommet 3432. The high to low voltage AC/DC adapter 3434 allows Low voltage DC Power to be distributed within the Christmas tree to various connectors, and/or light strings on the decorative lighted Christmas tree.

Figure 35:
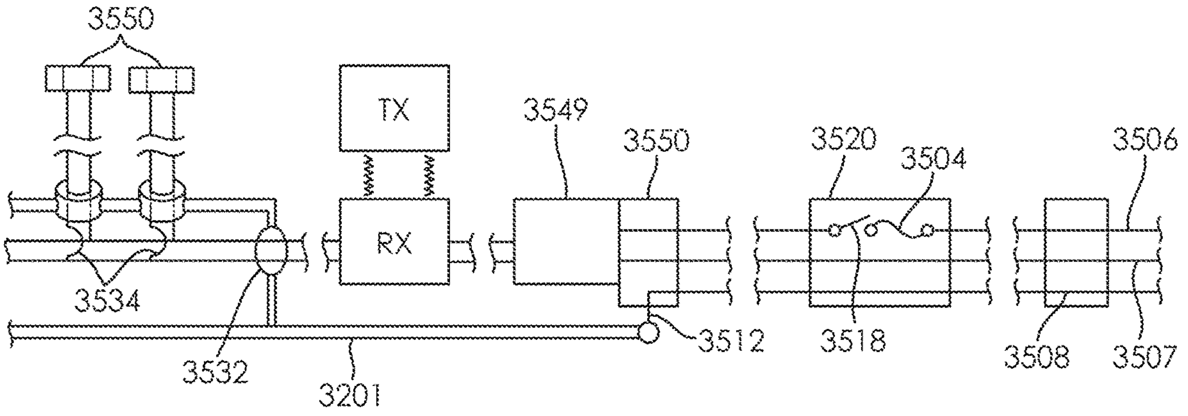
FIG. 35 shows a schematic diagram of a safety system for grounding a powered decorative tree according to the embodiment illustrated in FIG. 27 of the present invention.

FIG. 35 shows a schematic diagram of the safety grounded decorative lighted Christmas tree according to the embodiments illustrated in FIGS. 33 and 34. The 3-wire leads include hot wire 3506, neutral wire 3507 and safety ground wire 3508. Hot wire lead 3506 is connected to a fuse, (not shown) or a circuit breaker, (as shown in FIG. 35), that then connects to a single pole switch 3518 located inside foot petal switch housing 3520. Hot wire 3506, neutral wire 3507 and safety ground wire 3508 exit the switch housing 3520 and terminate in polarized socket 3550. Safety ground wire 3508 is bonded to the rounded conductive metal trunk 3501 at bonding point 3512. A high to low voltage AC to DC adapter 3549 is shown connected to female polarized socket 3550. The use of a circuit breaker or fuse in the hot wire circuit 3506 and the use of a low voltage DC system in the tree wiring provide a dual safety protection for the tree. The hot wire 3506 and neutral wire 3507 enter the rounded conductive metal trunk 3501 through insulated grommet 3532 and exit through two insulated grommets 3534 and terminate externally into DC polarized connectors 3550. The high to low voltage AC to DC adapter 3549 allows Low voltage DC Power is distributed within the Christmas tree from the DC polarized connectors 3550 to various, connectors, and/or light strings on the decorative lighted Christmas tree.

Figure 36:
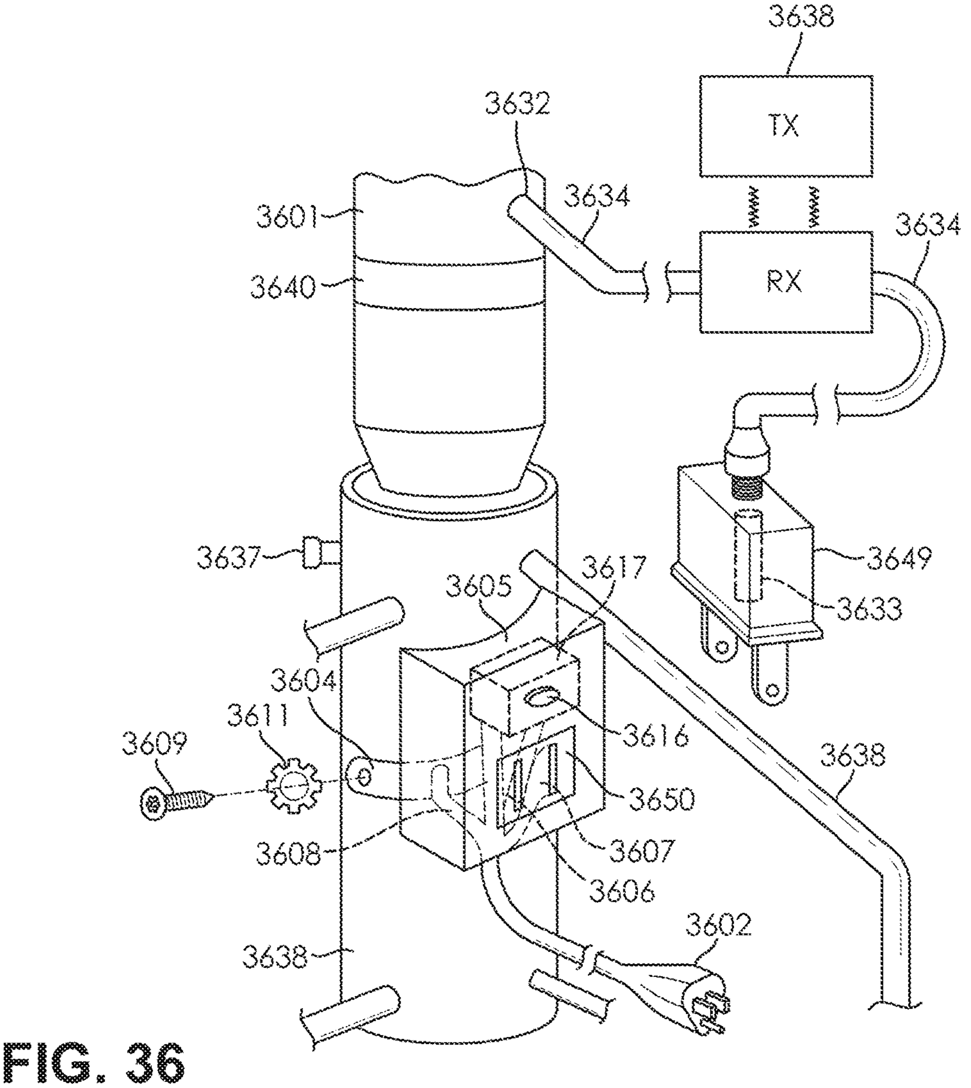
FIG. 36 shows a safety system for powering a decorative tree, according to some embodiments of the present invention.

According to yet another embodiment of the present invention, FIG. 36 is a perspective view of an electrical safety system for use with a decorative lighted Christmas tree, the system comprising a pole mounted molded electrical box 3605 secured to the rounded conductive metal trunk 3601 of a decorative lighted Christmas tree. Power is supplied to the decorative lighted Christmas tree from a three prong safety grounded plug 3602 which provides hot wire 3606, neutral wire 3607 and safety ground wire 3608. Hot wire 3606 is electrically connected to circuit breaker 3617. Hot wire 3606 and neutral wire 3607 exit the circuit breaker 3617 and terminate in polarized socket 3650. A high to low voltage AC to DC adapter 3634, integrated within a male electrical plug 3649 in all of the low voltage embodiments of the disclosure (is configured to be connected to polarized socket 3650. FIG. 36 further includes a remote control device TX/RX 3636, 3637 which provides users with a capability to remotely change the LED patterns of decorative light strings in the decorative lighted Christmas tree. The remote control device TX/RX 3636, 3637 is inserted in series with the power wires 3633 of the male electrical plug 3649 that enter the trunk of the decorative lighted Christmas tree trunk 3601 through a securing grommet 3632. The high to low voltage AC to DC adapter 3633 embedded within male electrical plug 3649 allows low voltage DC Power to be distributed within the Christmas tree to various polarized DC connectors, and/or light strings on the decorative lighted Christmas tree. A safety ground feature is provided by safety ground wire 3608 bonded to grounding strap 3604. Grounding strap 3604 is mounted to the rounded conductive metal trunk 3638 of the decorative lighted Christmas tree by star washer 3611 and tamper-proof screw 3609.

Figure 37:
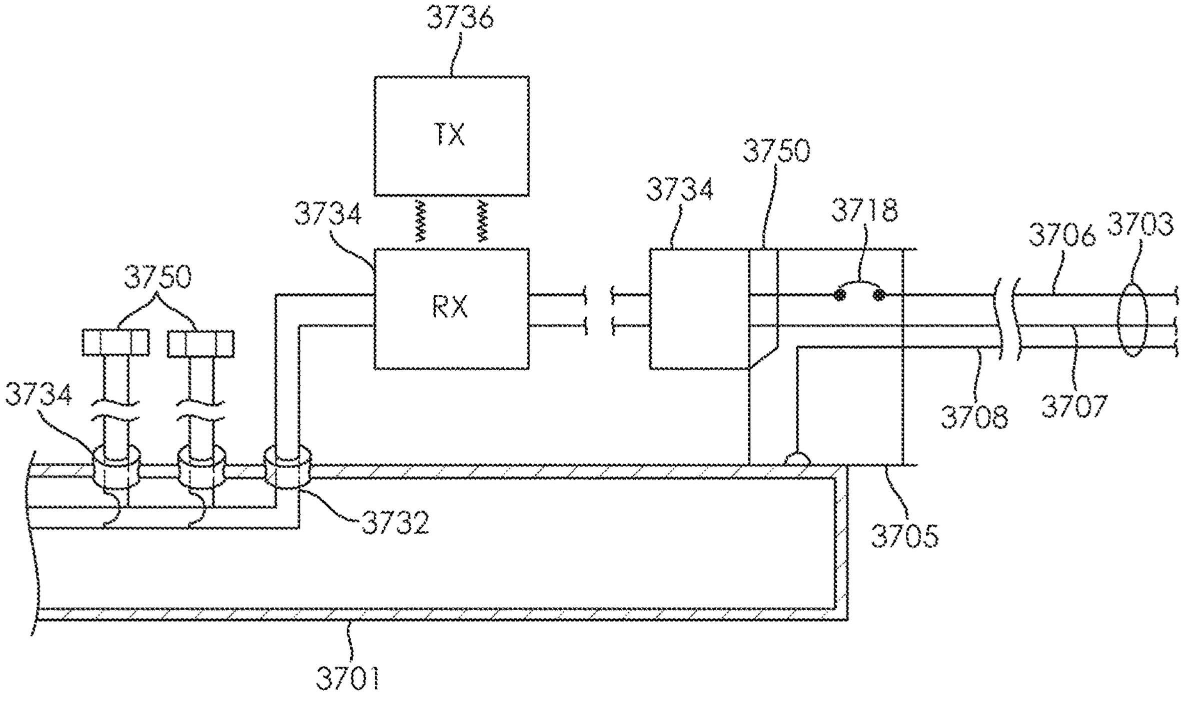
FIG. 37 shows a schematic diagram of a safety system for grounding a powered decorative tree according to the embodiment illustrated in FIG. 36 of the present invention.

FIG. 37 shows a schematic diagram of the safety grounded decorative lighted Christmas tree according to the embodiment illustrated in FIG. 36. The 3-wire leads 3703 include hot wire lead 3706, neutral wire lead 3707 and safety ground wire lead 3708. Hot wire lead 3706 is connected to a circuit breaker 3617 located inside housing 3705. Hot wire 3706, neutral wire 3707 and safety ground wire 3708 exit the circuit breaker 3718 and terminate in female polarized socket 3750 Safety ground wire 3708 is bonded to the rounded conductive metal trunk 3701 at bonding point 3712. The plug leads terminate in a high to low voltage AC to DC adapter 3734. The leads exit the high to low voltage AC to DC adapter 3734 and connect to remote control TX/RX 3736, 3737 and enter the rounded conductive metal trunk 3701 through insulated grommet 3732 and exit through insulated grommets 3734 and terminate externally into DC connectors 3750.

What is claimed is:

1. A multi-function electrical safety system for use with a decorative lighted Christmas tree, the system comprising:

a pole mounted molded electrical junction box comprising a housing configured to attach to a conductive metal trunk of the decorative lighted Christmas tree;

a circuit breaker located within the housing of the electrical junction box and having stationary and movable contacts operable between open and closed positions; and a manually operable reset button located on the molded electrical junction box, the manually operable reset button being electrically connected to the circuit breaker for selectively actuating the circuit breaker for opening the movable contacts.

2. The multi-function electrical safety system of claim 1, further comprising first and second flanges on the housing that are configured to attach the pole mounted electrical junction box to the conductive metal trunk.

3. The multi-function electrical safety system of claim 2, further comprising a three-prong safety grounded plug coupled to the housing of the electrical junction box for supplying power to the electrical junction box from an external voltage source over a multi-conductor cable comprising a neutral member, a hot member and a ground member, wherein the ground member of the multi-conductor cable terminates in a ring terminal and is mounted to the conductive metal trunk via a star washer and tamper-proof securing screw.

4. The multi-function electrical safety system of claim 1, further comprising a grounding strap on the housing that is configured to attach the pole mounted electrical junction box to the conductive metal trunk.

5. The multi-function electrical safety system of claim 4, wherein the grounding strap is a single piece metal formed with a mounting hole at each end.

6. The multi-function electrical safety system of claim 5, wherein each of the mounting holes is adapted to receive a tamper proof screw and star washer to secure the grounding strap to the conductive metal trunk.

7. The multi-function electrical safety system of claim 4, further comprising a three-prong safety grounded plug coupled to the housing of the electrical junction box for supplying power to the electrical junction box from an external voltage source over a multi-conductor cable comprising a neutral member, a hot member and a ground member, wherein the ground member of the multi-conductor cable terminates is bound to the grounding strap on the housing.

8. A multi-function electrical safety system for use with a decorative lighted Christmas tree, the system comprising:

a pole mounted molded electrical junction box comprising a housing configured to attach to a conductive metal trunk of the decorative lighted Christmas tree;

a foot switch in electrical communication with the pole mounted molded electric junction box, the foot switch configured to toggle on and off an electrical signal provided from an external source to the pole mounted molded electrical junction box;

a circuit breaker located within a foot switch housing of the foot switch, the circuit breaker having stationary and movable contacts operable between open and closed positions; and a manually operable reset button located on the foot switch housing, the manually operable reset button being electrically connected to the circuit breaker for selectively actuating the circuit breaker for opening the movable contacts.

9. The multi-function electrical safety system of 8, further comprising a three-prong safety grounded plug for supplying power to the pole molded electrical junction box from an external source over a multi-conductor cable comprising a neutral member, a hot member and a ground member.

10. The multi-function electrical safety system of 9, wherein the circuit breaker connects to the hot member between the foot switch and the three-prong safety plug.

11. The multi-function electrical safety system of 9, wherein the neutral member and the ground member pass through the foot switch housing without connecting to the foot switch.

12. The multi-function electrical safety system of 8, further comprising first and second flanges on the housing that are configured to attach the pole mounted electrical junction box to the conductive metal trunk.

13. The multi-function electrical safety system of 8, further comprising a grounding strap on the housing that is configured to attach the pole mounted electrical junction box to the conductive metal trunk.

14. The multi-function electrical safety system of claim 13, wherein the grounding strap is a single piece metal formed with a mounting hole at each end.

15. The multi-function electrical safety system of claim 14, wherein each of the mounting holes is adapted to receive a tamper proof screw and star washer to secure the grounding strap to the conductive metal trunk.

16. A multi-function electrical safety system for use with a decorative lighted Christmas tree, the system comprising:

a pole mounted molded electrical junction box comprising a housing configured to attach to a conductive metal trunk of the decorative lighted Christmas tree;

a circuit breaker having stationary and movable contacts operable between open and closed positions; and a manually operable reset button electrically connected to the circuit breaker for selectively actuating the circuit breaker for opening the movable contacts.

17. The multi-function electrical safety system of claim 16, wherein the circuit breaker is located within the housing of the electrical junction box and the manually operable reset button is located on the molded electrical junction box.

18. The multi-function electrical safety system of claim 16, further comprising a foot switch in electrical communication with the pole mounted molded electric junction box, wherein the circuit breaker is located within a foot switch housing of the foot switch and the manually operable reset button is located on the on the foot switch housing.

19. The multi-function electrical safety system of claim 16, further comprising first and second flanges on the housing that are configured to attach the pole mounted electrical junction box to the conductive metal trunk.

20. The multi-function electrical safety system of claim 16, further comprising a grounding strap on the housing that is configured to attach the pole mounted electrical junction box to the conductive metal trunk.

* * * * *